United States Patent [19]

Roberts et al.

[11] Patent Number: 5,237,647
[45] Date of Patent: Aug. 17, 1993

[54] COMPUTER AIDED DRAWING IN THREE DIMENSIONS

[75] Inventors: Andrew F. Roberts, Charlestown; Emanuel M. Sachs, Somerville; David R. Stoops, Cambridge; Karl T. Ulrich, Belmont; Todd L. Siler, Cambridge; David C. Gossard, Andover; George W. Celniker, Cambridge, all of Mass.

[73] Assignee: Massachusetts Institute of Technology, Cambridge, Mass.

[21] Appl. No.: 784,649

[22] Filed: Oct. 28, 1991

Related U.S. Application Data

[63] Continuation of Ser. No. 410,362, Sep. 20, 1989, abandoned, which is a continuation-in-part of Ser. No. 408,130, Sep. 15, 1989, abandoned.

[51] Int. Cl.$^5$ .................... G06F 15/60; G08C 21/00
[52] U.S. Cl. .................................. 395/119; 395/133; 340/706; 340/709; 178/18
[58] Field of Search ........................... 395/118-127, 395/133; 340/706, 709; 178/18, 19

[56] References Cited

U.S. PATENT DOCUMENTS

| | | | |
|---|---|---|---|
| 4,209,255 | 6/1980 | Heynau | 356/152 |
| 4,638,119 | 1/1987 | Blesser et al. | 178/19 |
| 4,654,648 | 3/1987 | Herrington et al. | 340/710 |
| 4,777,329 | 10/1988 | Mallicoat | 178/18 |
| 4,794,634 | 12/1988 | Torihata et al. | 379/96 |
| 4,806,707 | 2/1989 | Landmeir | 178/18 |
| 4,885,433 | 12/1989 | Schier | 178/19 |

FOREIGN PATENT DOCUMENTS

0121387 10/1984 European Pat. Off. .............. 178/18

OTHER PUBLICATIONS

Susan Montooth, *Easy CAD 1.08* manual, Evolution Computing, 1987, pp. 38-149, 164-173 and 280-281.
Lawrence G. Roberts; "The Lincoln Wand," M.I.T. Lincoln Laboratories Report, Lexington, Mass., 1966.
Elmer, Dewitt; "Through the 3-D Looking Glass"; TIME Magazine, May 1, 1989.
A. P. Pentland; "Toward an Ideal 3-D CAS System"; Image Understanding and the Man-Machine Interface, 1987.
A. P. Pentland; "Perceptual Organization and the Representation of Natural Form"; Artifical Intelligence, vol. 28, 1986; pp. 293-331.
A. P. Pentland, and J. Kou; "The Artist at the Interface"; M.I.T. Media Lab Vision Sciences Technical Report 114, Jan., 1989.
J. H. Clark; "Designing Surfaces in 3D"; Communica- (List continued on next page.)

*Primary Examiner*—Gary V. Harkcom
*Assistant Examiner*—Michael A. Jaffe
*Attorney, Agent, or Firm*—Fish & Richardson

[57] ABSTRACT

A computer system for aiding in the design of an object, comprising a first sensor representing the object and adapted to be moved in three dimensions in a work area by a designer, the first sensor providing signals to the computer system that indicate its position and orientation in the work area, and a second sensor adapted to be moved by the designer in three dimensions in the work area, the second sensor providing signals to the com- (List continued on next page.)

puter system that indicate its position and orientation in the work area; the computer system responds to the signals from the first and second sensors by creating a displayed image corresponding to a three-dimensional model of the object in a virtual work area that corresponds to the designer's work area, the model comprising lines that each have a shape and position that corresponds to movement by the designer of at least one of the sensors, and by controlling the position and orientation of the model in the virtual work area in accordance with the motion of at least one of the sensors.

56 Claims, 26 Drawing Sheets

OTHER PUBLICATIONS tions of the ACM, vol. 19, No. 8, Aug., 1976, pp. 454-460.
J. D. Foley; "Interfaces for Advanced Computing"; Scientific American, vol. 257, No. 4; Oct., 1987.
F. H. Raab, E. B. Blood, T. O. Steiner and H. R. Jones; "Magnetic Position and Orientation Tracking System"; IEE Trans. Aerospace and Electronic Systems; Sep. 1979.
C. Ware and D. R. Jessome; "Using the Bat: A Six-Dimensional Mouse for Object Placement: CG & A", pp. 65-70; Nov., 1988.
C. M. Schmandt; "Interactive Three-Dimensional Computer Space"; SPIE Conf. Processing and Display of Three Dimensional Data; Aug., 1982.
C. M. Schmandt; "Spatial Input/Display Correspondence in a Stereoscopic Computer Graphic Work Station"; Computer Graphics, vol. 17, No. 3; Jul. 1983.
T. D. DeRose; "Interactive Surface Modeling in the Three Dimensional Design Space"; NSF Design and Manufacturing Systems Conf.; Jan., 1990.

MATRICES USED: MODELING, VIEWING AND PROJECTION TRANSFORMATIONS.

TRANSLATE by $(T_x, T_y, T_z)$ ⇒ i.e., trans $(T_x, T_y, T_z)$ $$\begin{bmatrix} 1 & 0 & 0 & 0 \\ 0 & 1 & 0 & 0 \\ 0 & 0 & 1 & 0 \\ T_x & T_y & T_z & 1 \end{bmatrix}$$

SCALE by $(S_x, S_y, S_z)$ ⇒

$$\begin{bmatrix} S_x & 0 & 0 & 0 \\ 0 & S_y & 0 & 0 \\ 0 & 0 & S_z & 0 \\ 0 & 0 & 0 & 1 \end{bmatrix}$$

ROTATE about "x" by $\Theta$ ⇒ i.e., $Rot_x(\Theta)$ $$\begin{bmatrix} 1 & 0 & 0 & 0 \\ 0 & \cos\Theta & \sin\Theta & 0 \\ 0 & -\sin\Theta & \cos\Theta & 0 \\ 0 & 0 & 0 & 1 \end{bmatrix}$$

ROTATE about "y" by $\varphi$ ⇒ i.e., $Rot_y(\varphi)$ $$\begin{bmatrix} \cos\varphi & 0 & -\sin\varphi & 0 \\ 0 & 1 & 0 & 0 \\ \sin\varphi & 0 & \cos\varphi & 0 \\ 0 & 0 & 0 & 1 \end{bmatrix}$$

ROTATE about "z" by $\beta$ ⇒ i.e. $Rot_z(\beta)$ $$\begin{bmatrix} \cos\beta & \sin\beta & 0 & 0 \\ -\sin\beta & \cos\beta & 0 & 0 \\ 0 & 0 & 1 & 0 \\ 0 & 0 & 0 & 1 \end{bmatrix}$$

FIG. 2A

VIEWING TRANSFORMATION POLARVIEW (dist, axim, inc) =

Rotz(-axim)*ROTx(-inc.)* trans(0, 0, -dist).

where axim, dist., and inc. are defined blow:

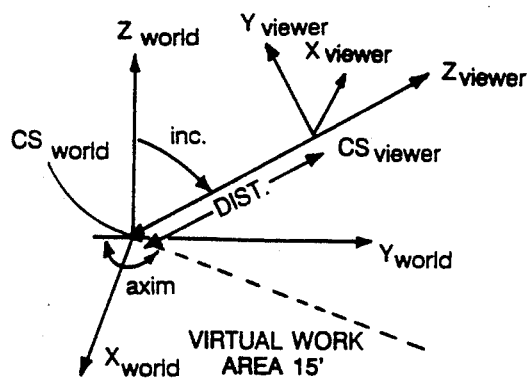

The polarview transformation matrix is defined as [world-to-viewer].

FIG. 2B

PERSPECTIVE PROJECTION TRANSFORM:

$$\begin{bmatrix} \dfrac{\cotan\left(\dfrac{f.o.v.}{2}\right)}{a.r.} & 0 & 0 & 0 \\ 0 & \cotan\left(\dfrac{f.o.v.}{2}\right) & 0 & 0 \\ 0 & 0 & \dfrac{-(far+near)}{far-near} & -1 \\ 0 & 0 & \dfrac{-2\cdot far\cdot near}{far-near} & 0 \end{bmatrix}$$

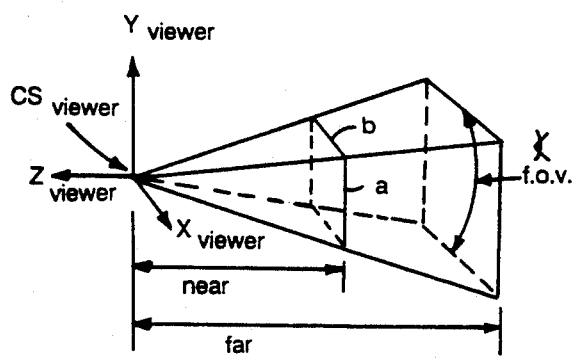

The perspective projection matrix is defined as [viewer-to-projection plane].

f.o.v. = field of view angle.
b/a = a.r. = aspect ratio.

FIG. 2C

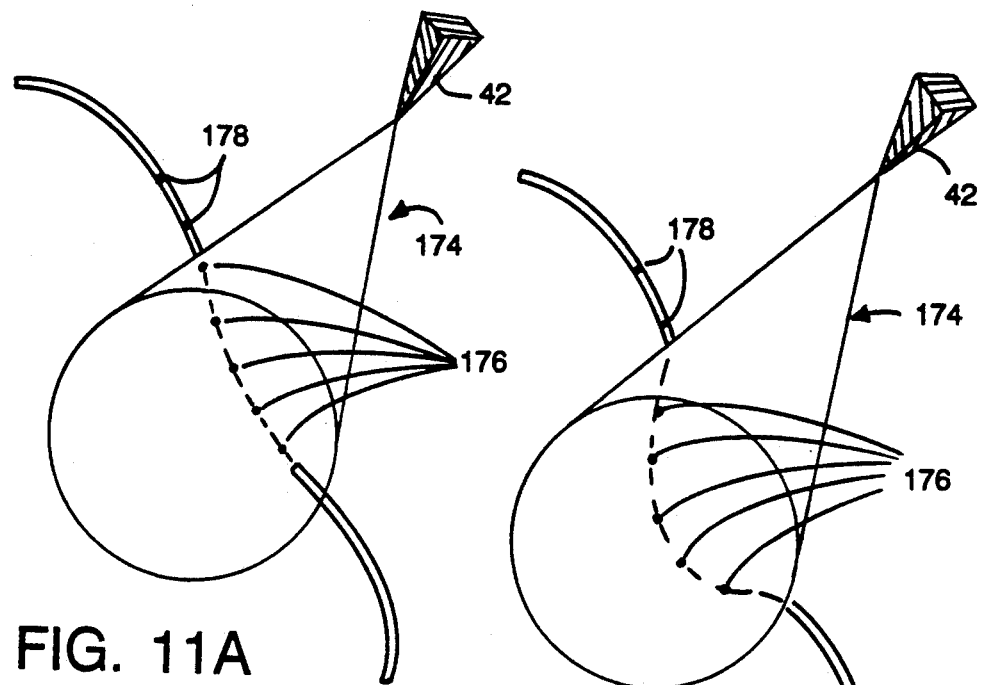
FIG. 11A
FIG. 11B
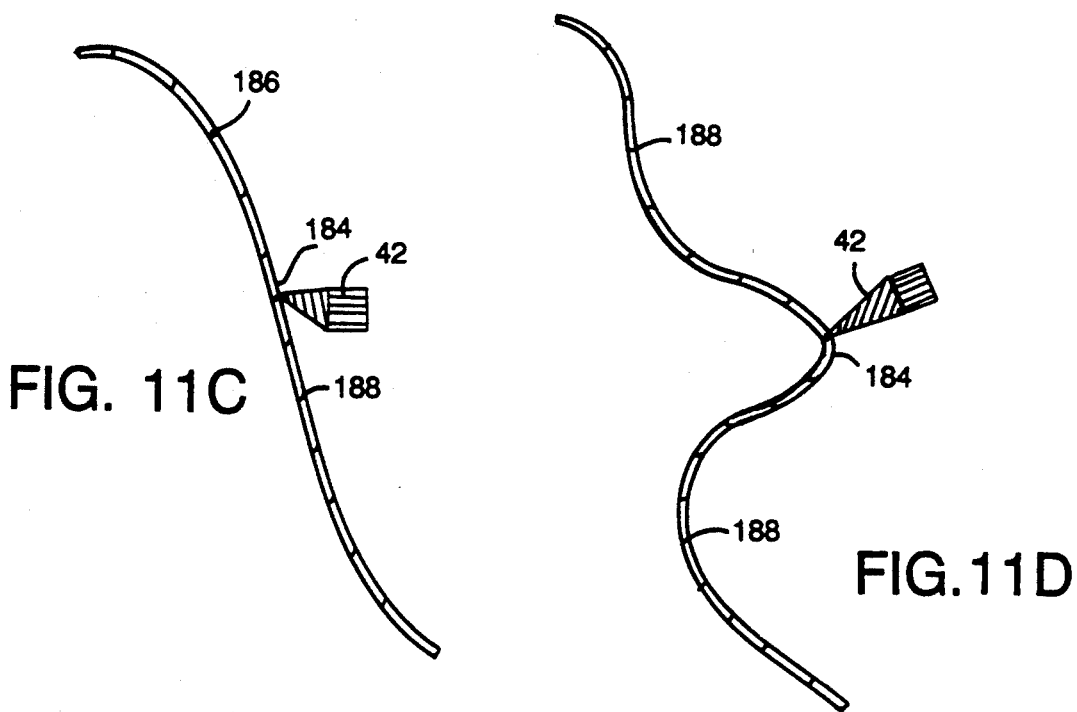
FIG. 11C
FIG. 11D

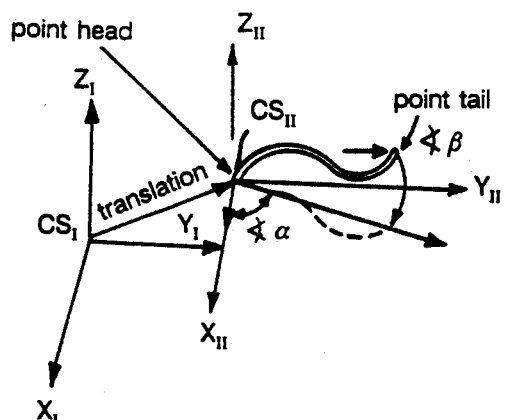

FIG. 19A

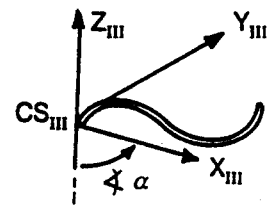

FIG. 19B

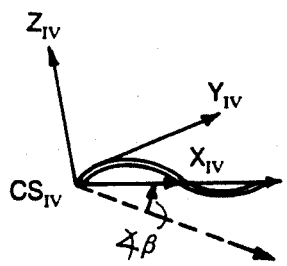

402A    build from head to tail points on line.
           [line vec] = [point tail] - [point head]
402B    compute length of [line vec]; store in line-len
402C    compute $\angle\alpha$ = arctan (line-vec$_y$/line-vec$_x$)
402D    compute $\angle\beta$ = arctan (line-vec$_z$/line len)

[axis-twist] = [translate by (-head point)]*[Rot by -$\alpha$ about "z"]*[Rot. by $\beta$ about "y"]
                                        402E                 402F              402G

[line-to-object] = [axis-twist]*[Rot. by (-Roll $\angle$of old orientation / of stylus about "x" stylus) about "x"] *
           402H                                           402I

[Rot. by ((Roll $\angle$of new orientation / of stylus about "x" stylus) about "x"]*
                                          402J translate CS$_{line}$ to head pt. on line & align CS$_{line}$ so x axis of CS$_{line}$ is parallel to axis through line's end points.

Rotate CS$_{line}$ about axis joining line's endpoints by amount corresponding to change in twist about stylus' longitudinal axis.

[axis-twist-inv]
    402K

Rotate and translate CS$_{line}$ by opposite amounts specified in 402H

COMPUTER AIDED DRAWING IN THREE DIMENSIONS

The Government has rights in this invention pursuant to contract Number N00014-85-K-0124 awarded by the Department of the Navy.

This is a continuation of copending application(s) Ser. No. 07/410,362 filed on Sep. 20, 1989 now abandoned which is a continuation in part of Ser. No. 07/408,130, filed Sep. 15, 1989, now abandoned.

BACKGROUND OF THE INVENTION

This invention relates to creating three-dimensional models of an object being designed with the aid of a computer.

Known computer-aided design (CAD) systems are used to refine the design, e.g., the size and shape, of objects whose general size, shape and scale have already been determined. Typically, this information is entered into the computer, and the object is displayed to the designer in roughly finished form. The designer then implements one or more CAD routines to refine the design in selected ways. For example, if the object being designed is a yacht, the CAD system may be used to implement subtle changes in the contours of the hull to increase the hull's efficiency in the water. The designer communicates with the CAD system in a variety of ways, for example, using the computer keyboard, a mouse, a tablet, or so-called "joy-sticks" or "pucks".

The initial design is typically done manually by the designer using pencil and paper, with the design given three dimensional attributes on the sketchpad via hatching and shading. Thus, to adequately represent the object at this early stage of the design process often requires several pages of two dimensional sketches, each representing one view of the object. Also, the above-mentioned computer interfaces generally restrict the designer to working on the object in one plane at a time, thereby discouraging use of CAD systems to generate the initial design of the object.

One alternative is for the designer to enter information about the three dimensional design in the form of points (i.e., coordinates) of the shape, but this requires that each point be evaluated by the designer and entered into the computer one coordinate (and thus one dimension) at a time.

SUMMARY OF THE INVENTION

One general aspect of the invention is a computer system for aiding in the design of an object, comprising a first sensor representing the object and adapted to be moved in three dimensions in a work area by a designer, the first sensor providing signals to the computer system that indicate its position and orientation in the work area, and a second sensor adapted to be moved by the designer in three dimensions in the work area, the second sensor providing signals to the computer system that indicate its position and orientation in the work area; the computer system responds to the signals from the first and second sensors by creating a displayed image of a three-dimensional (3D) model of the object in a virtual work area that corresponds to the designer's work area, the model including lines that each have a shape and position that corresponds to the designer's movement of at least one of the sensors, and by controlling the position and orientation of the model in the virtual work area in accordance with the motion of at least one of the sensors.

Preferred embodiments include the following features.

The model has a position and orientation in the virtual work area that corresponds to the position and orientation of the first sensor in the designer's work area, whereby as the designer moves the first sensor in three dimensions the computer system alters the model to simulate corresponding three-dimensional movement of the displayed model in the virtual work area.

The first sensor is adapted to be hand held, and the computer system displays a representation of the first sensor at a position and orientation in the virtual work area that corresponds to the position and orientation of the first sensor in said designer's work area; thus, as designer moves the first sensor in three dimensions the computer system concurrently moves its representation to simulate corresponding three dimensional movement in the virtual work area, thereby to provide to the designer a sensation of holding the representation of the first sensor. The first sensor is preferably mounted on a working surface (e.g., a planar pad (which may include grids and an erasable writing surface) or an article that fits in the palm of the hand), and the representation represents the working surface.

The computer system additionally displays a representation of the second sensor at a position and orientation in the virtual work area that corresponds to a position and orientation of the second sensor in the designer's work area; thus, as the designer moves the second sensor in the three dimensions, the computer system concurrently moves the representation of the second sensor to simulate corresponding three dimensional movement of it in the virtual work area, thereby to give the designer the sensation of holding the representation of the second sensor. Preferably, the second sensor represents a tool and is adapted to be hand held by the designer The second sensor is disposed in a stylus, and the representation represents said stylus on the display. Thus, when the designer holds the first and second sensors in two hands, the displayed positions, orientations, and movement of the model, the representation of the first sensor, and the representation of the second sensor correspond to the relative positions, orientations, and movements of the hands to provide kinesthetic feedback to the designer. This greatly facilitates the designer's task in drawing a 3D model of the object at the earliest stages of design.

As a result, the designer utilizes this CAD system beginning at the first stages of conceptual design to transfer a three dimensional mental image of a design directly into a three dimensional computer representation. Thus, intermediate design stages (e.g., perspective paper drawings, planar slices of volumetric shape information, etc.) are eliminated.

Full three dimensional (3D) motion of the designer's hands is utilized to develop free form shapes and control objects in the computer's work environment. The sensors are hand held and each detect motion with six degrees of freedom. The sensor in one hand (the drawing hand) is housed in a stylus that includes one or more finger actuated buttons for invoking drawing functions and controlling the sequencing of the drawing program. The stylus acts like a pencil in three dimensional space and allows the designer to draw lines which are captured by the computer as three dimensional curves. The sensor held by the other hand controls the orientation and position of the object being created in the workspace. The computer's display shows a perspective view of the object that is consistent with the line of sight between the designer and his or her hands.

The computer system executes sequences of operations to aid in the design of the object. These sequences of operation permit the designer to design the object using the following four step procedure: the lines are created to produce a rough outline of the object; the lines are then edited to form a skeletal outline of the object; surfaces are fit to groups of the lines about the the skeletal outline; and the surfaces are modified to produce a final shape of the object. The designer can selectively control a succession of the execution of the sequences by sending control signals to the computer system, and the control signals may be sent at any time during the execution. The control signals are sent, for example, by depressing the stylus pushbutton one or more times.

The computer system displays one or more tokens (e.g. icons) that provide the designer with choices as to which sequence is to be executed. The designer selects one of the displayed choices by moving the stylus so that a displayed representation of the stylus coincides with a position of the token that corresponds to the choice, and sending a control signal using the stylus button. The tokens are displayed in the form of one or more palettes, or one or more menus, and the selection of at least one token in one of said menus (or both). The selection of at least one token in one or more of the menus or palettes causes a submenu or "information box" containing additional choices to be displayed. When the designer is scanning the tokens, the computer system responds only to two dimensional stylus movement. This avoids the necessity of the designer moving the stylus by varying amounts depending upon the proximity of the stylus to the display.

One or more of the choices represented by the tokens corresponds to a sequence for creating a line. Other choices correspond to one or more sequences for editing a line.

When creating a line, the designer may specify, in any order, the shape of the line, the position and orientation of the line in the virtual work area, and the scale of the line. The designer specifies the shape of the line by moving the first sensor to trace a corresponding shape in the designer's work area. This is done by depressing and holding down the button, moving the stylus to trace the corresponding shape, and releasing the button to cause the computer system to capture the shape in the virtual work area. The designer further may twist the line about an axis containing the line's endpoints by rotating the stylus about its longitudinal axis while holding the button depressed.

The first and second sensors are six degree of freedom devices that permit the designer seven degrees of freedom in specifying the position and orientation of the line in the virtual work area; namely: the spatial coordinates for each endpoint of the line and an angular orientation of the line with respect to an axis containing the endpoints. The designer may, before creating the line, prespecify any one or more of the degrees of freedom. For example, the spatial coordinates of both endpoints of said line may be prespecified (leaving the designer free to specify only one degree of freedom (angular orientation) after the line is drawn). Alternatively, the spatial coordinates of only one endpoint are prespecified. Spatial coordinates are prespecified by moving the stylus to a position in the designer's work area that corresponds to the coordinates, and signaling the computer system by depressing the stylus button.

The designer may also prespecify the scale of the line before drawing the line. One way in which this is done is to prespecify both endpoints.

The designer is thus enabled to draw freeform curves in space that serve as the foundation for wireframe structures. While the curves are being created with the drawing hand, the designer may rotate and or translate the object to which they are anchored simply by rotating and moving the sensor in the other hand, thereby obtaining immediate three dimensional feedback and optimizing the view of the object as a curve is being drawn. Curves can be grabbed with the stylus by aligning a 3D icon of the pen (which is continuously displayed on the screen) over a point on the line and pressing the finger actuated button on the stylus. Curves can also be edited and modified after being created, and surfaces can be fitted to curves and can also be modified.

In one embodiment, a single sensor can be used to control the position and orientation of the object in the workspace. The same sensor is used to draw freeform curves. Preferably, however, these functions are split between two sensors, as described above, thereby allowing simultaneous drawing and rotation of the object being drawn. The designer may change the position and orientation of the model by moving the first sensor without causing a line to be drawn by second sensor in the stylus, unless the stylus is enabled and moved.

In another embodiment, the designer uses the stylus and the second sensor to digitize an existing 3D shape (such as the hull of a boat) into which a new conceptual part (e.g., a rudder) must fit. The designer then can develop the new part around the digitized, existing part, rotating and otherwise manipulating the display to optimize the design process.

The system also includes several computational features that allow existing lines to be edited. For example, an existing line prespecified by the designer using the stylus may be copied and the copied line located at a position and orientation in the virtual work area that is specified by the designer; this is done by positioning the stylus at a corresponding position in the designer's work area and signaling the computer system using the stylus button. A mirror image of a line selected by the designer using the stylus may also be formed about a reflection plane. The designer may change the position and orientation of the reflection plane by correspondingly changing the position and orientation of the stylus, and signaling the computer system (using the button) when the desired location is obtained.

A line prespecified by the designer may also be rotated as a rigid body in the virtual work area in response to the designer rotating the stylus about its tip. The amount and direction of the rotation corresponds to the amount and direction of stylus rotation. A similar feature allows a preselected line to be rotated i.e., twisted) as a rigid body about an axis that includes the line's endpoints.

A line preselected by the designer may be translated as a rigid body from one position to another in the virtual work area that is selected by the designer; this selection is made by moving the stylus to a corresponding position and location in the designer's work area and signaling the computer system using the stylus button.

Groups of lines may also be edited. For example, a line connected to another line at a joint may be moved by an amount and in a direction that corresponds to motion of the stylus, and the joint prespecified to simulate the action of a "ball and socket" joint (or alternatively a rigid joint) during line movement.

A portion of a line (or an entire line) designated by the designer using the stylus may be deleted. The line is designated by positioning the stylus at a location in the designer's work area that corresponds to a location in the virtual work area of a point on the line, and signaling the computer system using the stylus button.

A line may also be modified by causing points on the line to be displaced to change the line's shape (using the stylus as a tool analogous to an "airgun"). The direction of displacement corresponds to the direction in which the stylus is pointed. The line may also be modified by "grabbing" a point on the line (e.g., using the stylus as a pair of "tweezers") and moving it to change the shape of the line. The direction of movement corresponds to that in which the designer moves the stylus.

Some lines are modeled with simulated physical characteristics so that the shape of these line responds to change according to the characteristics. One of these lines is modified by applying a simulated force to points on the line to move it in accordance with the force. The force may simulate outward pressure or suction. The direction of the applied force corresponds to the direction in which the designer points the stylus.

One or more primitive shapes (e.g., two dimensional shapes or three dimensional shapes) preselected by the designer may be created at a location in the virtual work area that the designer selects. The location is selected by the designer positioning the stylus at the corresponding location in the designer's work area and signaling the computer system using the stylus button.

The designer indicates to the computer system the selection of any line simply by moving the stylus so that the displayed representation of the stylus overlays a point on the line in a two dimensional plane of the display, and signaling the computer (such as by depressing the stylus button) to indicate the line. This features eliminates the necessity of the designer searching for the exact 3D location of the line point using the stylus.

The computer system may also be used to produce a displayed image corresponding to a three dimensional model of an object (i.e., to "digitize" the object) in response to the designer indicating positions and orientations of surfaces of the object by tracing it with the stylus.

The computer system includes a memory for storing data describing a plurality of objects for which models have been, or are to be, created. The memory is organized into files for different types of these objects, the files being accessible by the designer using a menu-driven format. The files constitute an "archetypical image bank" that contains "boilerplate" designs useful as starting points when a new design is to be made.

The invention provides a powerful and simple to use CAD tool that allows the designer to interact with a computer to aid in the design process staring at the earliest stages of the design process—when the design is merely an image in the designer's mind. The 3D-oriented sensors allow the designer to visualize the design in real time, every step of the way, and facilitates the creation and modification of the design. The object being designed can be initially created as a few disjointed, even disconnected lines, which the designer gradually brings together, augments with additional lines, and refines as necessary to create the finished design.

Other features and advantages of the invention may become apparent from the following detailed description, and from the claims.

DESCRIPTION OF THE PREFERRED EMBODIMENT

We first briefly describe the drawings

FIGS. 1, 1A and 1B show a computer-aided design (CAD) system according to the invention.

FIGS. 2A-2C show matrices used by the system of FIG. 1 to plot lines drawn by the designer.

FIGS. 11A-11D illustrate two methods of modifying the shape of lines according to the invention.

FIGS. 18, 19A-19C, and 20 are flow charts and diagrams that describe and illustrate twisting a line about an axis that contains its endpoints.

FIGS. 21-24 are flow charts and diagrams that and illustrate moving reflection planes.

Figure 25:
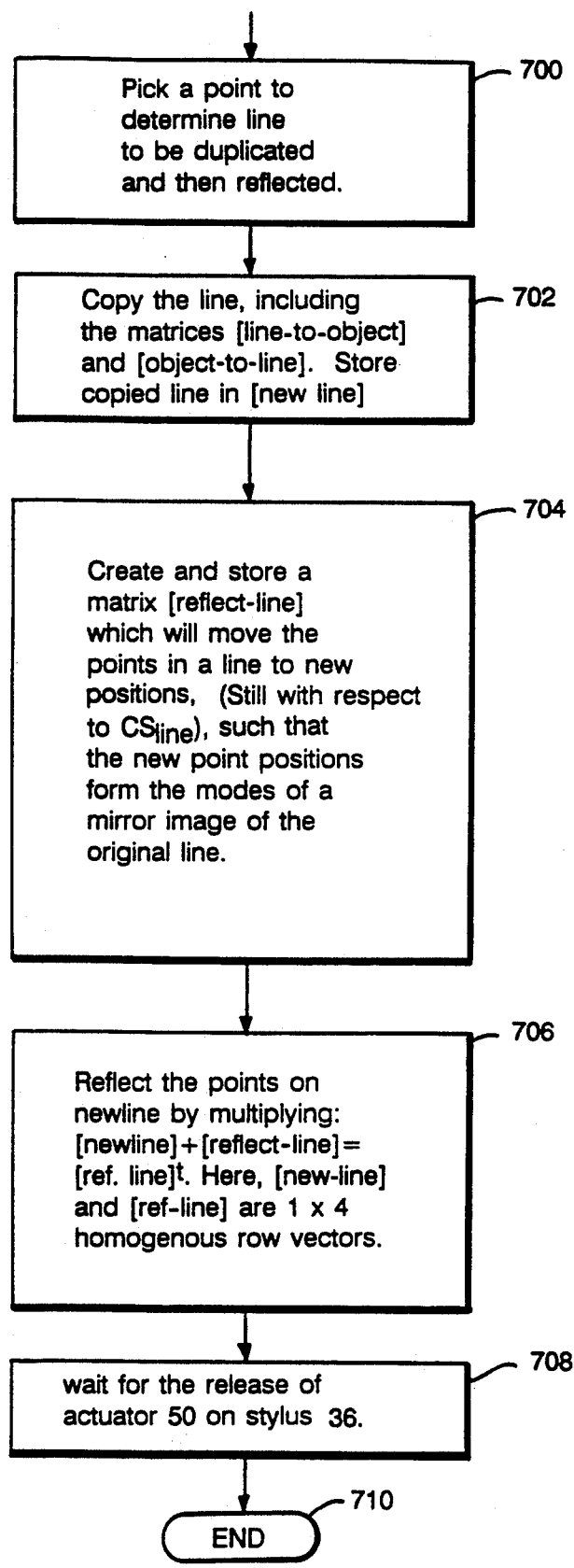
Figure 26:
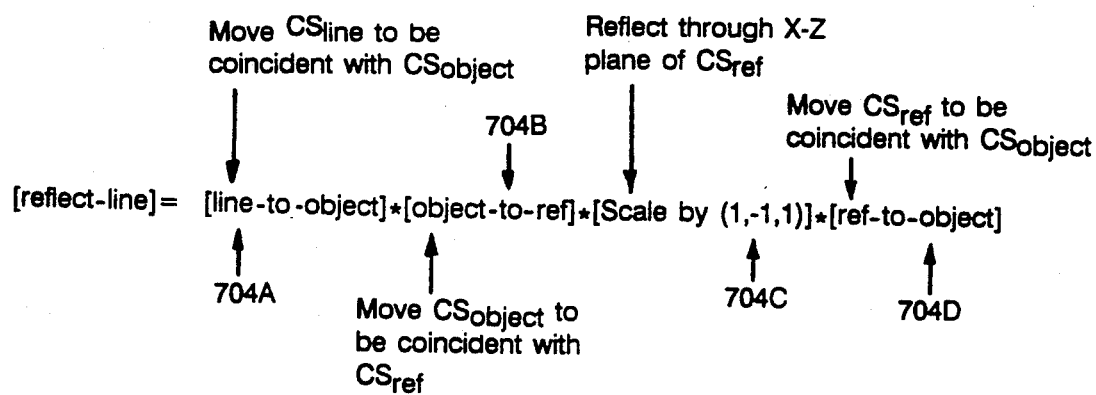

FIGS. 25 and 26 are flow charts showing steps taken to create a reflected line.

Figure 1:
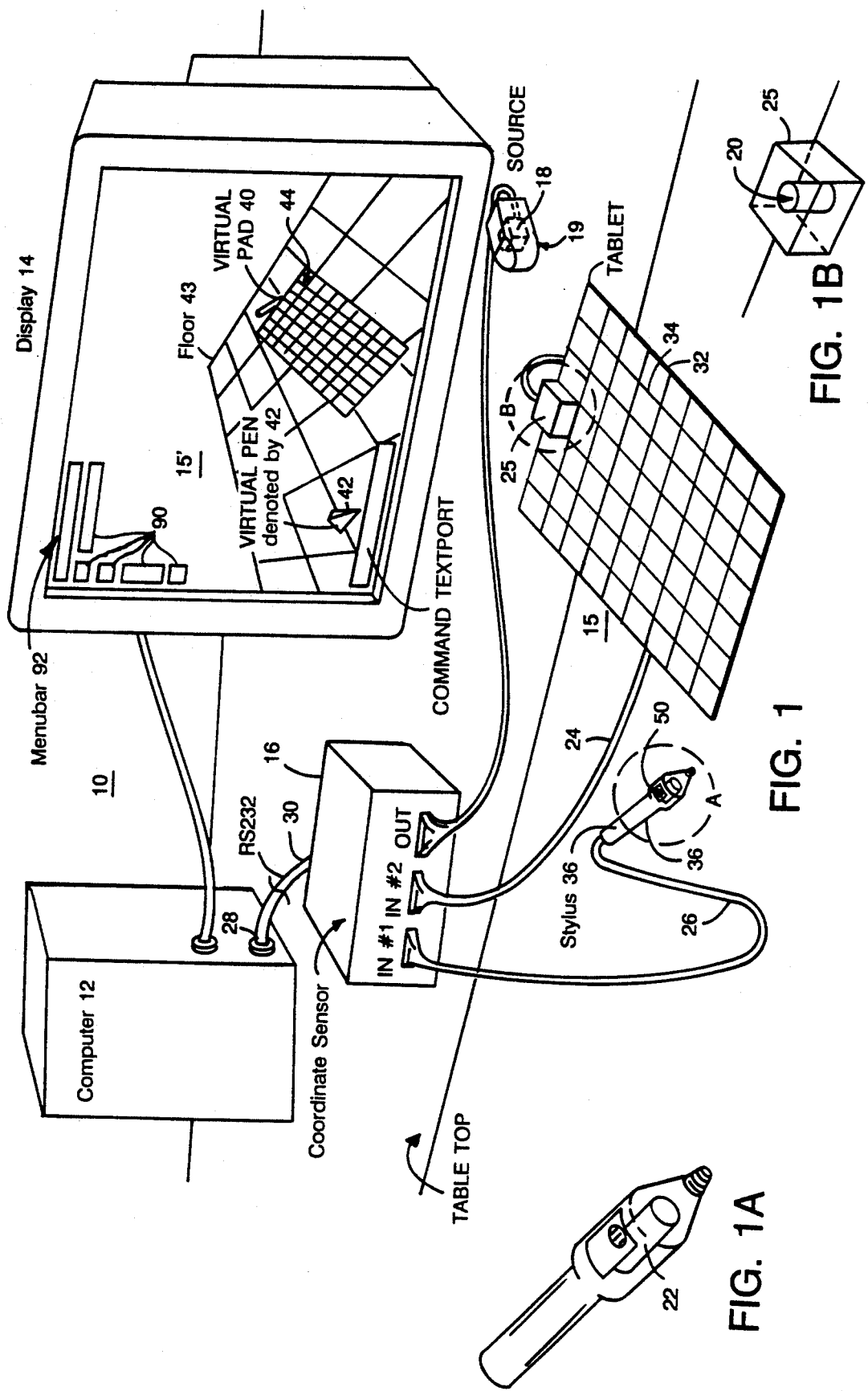
Figures 27, 28:
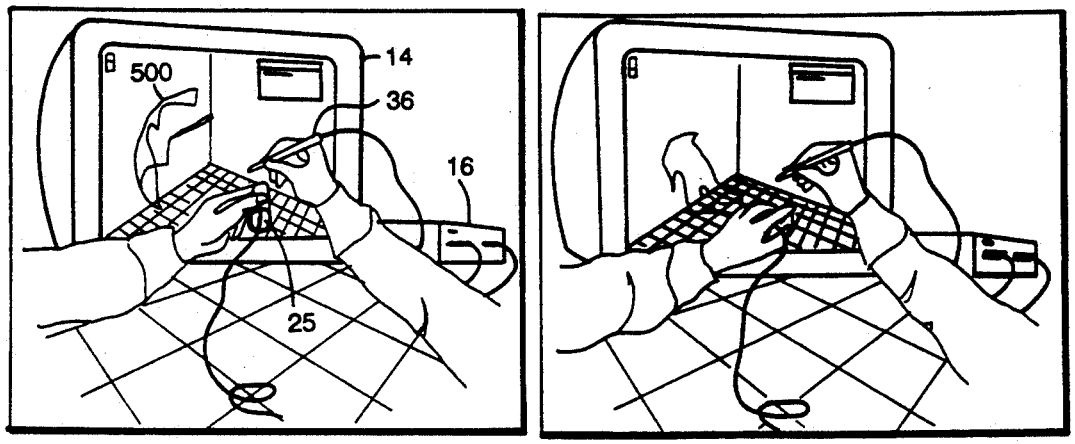

FIGS. 27 and 28 show an example of the operation of the CAD system of FIG. 1, in which an automobile fender is rotated.

FIGS. 29-36 show an example of the operation of the CAD system of FIG. 1, in which a yacht is designed.

STRUCTURE AND OPERATION

1. General Overview

Figure 2:
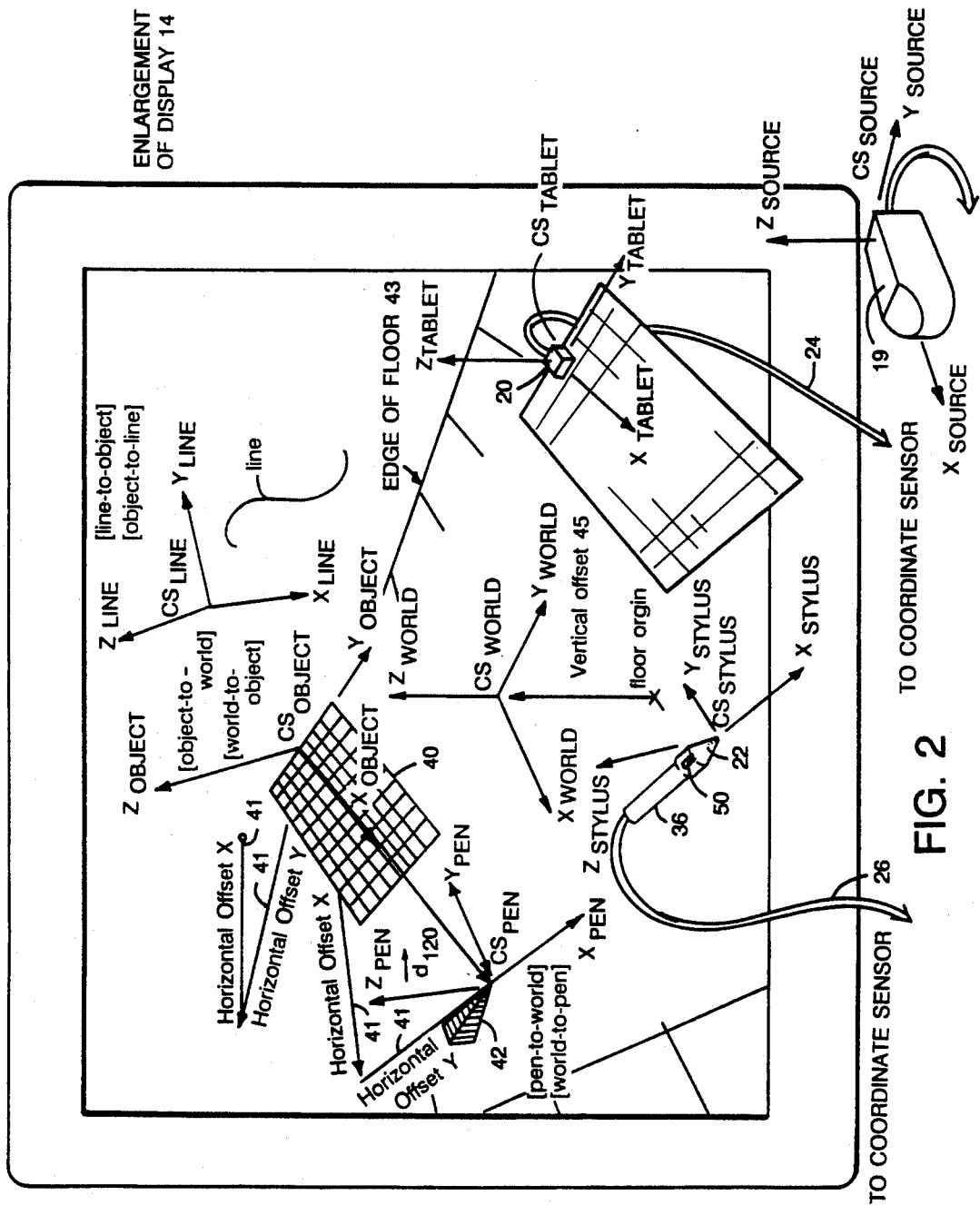
FIG. 2 illustrates the coordinate systems of the CAD system of FIG. 1.

Referring to FIGS. 1 and 2, computer-aided design (CAD) system 10 includes a computer 12 with associated display 14. Computer 12 is preferably a graphics computer, such as an IRIS model 4D70/GT graphics computer commercially available from Silicon Graphics, Inc. of Mountain View, Calif. CAD system 10 also includes a coordinate sensing system 16 (e.g., a 3Space Tracker commercially available from Polhemus, Inc. of Colchester, Vt.) that is equipped with a source 18 for producing a three-dimensional (3D) electromagnetic field that has its origin at source 18. Source 18 is located at the origin of a coordinate system $CS_{source}$ (i.e., $X_S$, $Y_S$, $Z_S$) in which positions within the electromagnetic field are measured by coordinate sensor 16 as discussed in detail below. Source is disposed within a block 19 that rests on a surface, such as a desk or table, on which computer 12 and display 14 are disposed.

A pair of sensors 20, 22 intercept the electromagnetic field produced by source 18 and apply analog electrical signals via cables 24, 26, respectively, to sensing system 16 that represent each of their relative spatial positions and orientations with six degrees of freedom (describing the x, y, z position coordinates, and orientation angles azimuth, elevation, and roll) within the field. The analog signals are sampled by sensing system 16 (e.g., at approximately 60 Hz.) and the resulting digital signals are applied to the RS 232 interface 28 of computer via cable 30. Computer 12 processes the position and orientation signals from sensing system 16 to generate a model and associated image on display 14 in a manner described in detail below.

Sensor 20 is, like source 18, embedded in a block 25, which is configured to be attached to a number of different hand held articles, such as planar pad 32. A grid divides pad 32 into equal-sized spaces. (Another example of such an article is a cube which naturally fits the contour of the hand, thereby allowing the user to grasp the sensor 20 and freely move the other hand in the unoccupied 3D space surrounding sensor 20.) The location and orientation of sensor 20 relative to the coordinate system $CS_{source}$ defines a tablet coordinate system $CS_{tablet}$ (i.e., $X_{tablet}, Y_{tablet}, Z_{tablet}$) which may be configured to have any orientation relative to pad 32 to which sensor 20 is attached. Sensor 20 is oriented so that pad 32 lies in a plane defined by ($Z_{tablet}=0$).

Sensor 22 is located near the tip of a pen-shaped stylus 36 and defines the origin of a stylus coordinate system $CS_{stylus}$ (i.e., $X_{stylus}, Y_{stylus}, Z_{stylus}$). Sensor 22 is Oriented within stylus 36 so that the x-axis (i.e., $X_{stylus}$) extends from the tip of stylus 36 parallel to its longitudinal axis, and the tip of stylus 36 is normal to the ($X_{stylus}=0$) plane.

Stylus 36 is further equipped with a finger actuated switch 50 in the form of a button which is used by the designer in a manner described in detail below to send signals (such as interrupt signals) via conductors in cables 26, 30 to computer 12 to control drawing and to control the sequence of operation of computer 12. Thus, the designer can completely control the design process without having to set down either stylus 36 or pad 32. Note that block 25 may also be equipped with a similar finger actuated button. The signals describing position and orientation of coordinate systems $CS_{stylus}$ and $CS_{tablet}$ are used by computer to specify the locations and orientations of an object coordinate system $CS_{object}$ and a pen coordinate system $CS_{pen}$ relative to a virtual world coordinate system $CS_{world}$. Since the incoming information from sensing system 16 describing $CS_{stylus}$ and $CS_{tablet}$ is measured with respect to the $CS_{source}$ coordinate system, the relative positions and orientations of $CS_{object}$ and $CS_{pen}$ with respect to $CS_{world}$ are similar by default to the relative positions and orientations of $CS_{tablet}$ and $CS_{stylus}$ with respect to $CS_{source}$.

Computer 12 displays a work area 15' that is a virtual analogue to the designer's work area 15 within the field produced by source 18. Thus, the designer sees on the display 14 a perspective view of the three dimensional space before him, and within this 3D space are the following visual representations: 1) The origin of $CS_{world}$ located just below the center of the screen and oriented so that $Z_{world}$ is vertical; 2) A floor 43 that simulates an imaginary floor or other surface that would occupy a position in work area in roughly the plane of the designer's lap when seated, the floor 43 having a location at the origin of $CS_{world}$ plus a vertical offset 45, and an orientation in the ($Z_{world}=0$) plane; 3) A virtual tablet 40, representing pad 32, that has a position and orientation corresponding to $CS_{object}$ plus a horizontal offset 41, and an optional vertical offset 45; 4) An icon of a "pen" 42, representing the stylus 36 (i.e., sensor 22). The "pen" icon 42 has a position and orientation that corresponds to those of $CS_{pen}$ plus a horizontal offset 41, and an optional vertical offset 45.

The horizontal offset 41, affecting position with respect to $X_{world}$ and $Y_{world}$, and the vertical offset 45, affecting $Z_{world}$, enable source 18 to be placed to the right or the left of display 14 in work area 15 without causing pen 42, virtual tablet 40, and the objects being drawn to lie off of display 14 when sensors 20 and 22 are held by the designer between himself/herself and the display.

Like pad 32, tablet 40 is divided into a grid 44 of equally sized spaces. Alternatively, the tablet 40 can be replaced by any number of visual icons which would illustrate different spatial relationships within the space surrounding $CS_{object}$. Tablet 40 moves and rotates in the same manner as pad 32 in work area 15. That is, as the designer moves pad 32 in any direction (e.g., vertically, horizontally, or rotationally) tablet 40 will undergo the same movement. It will thus be appreciated that the designer can move pad 32 (and hence tablet 40) through six degrees of freedom—along and rotationally about each axis. Pad 32 is thus useful as a 3D drawing point of reference for the designer developing an object using system 10.

Pen icon 42 also moves and pivots in work area 15' to mimic the movement and rotation of stylus 36 by the designer. Thus, the designer can also move icon 42 through six degrees of freedom—along each axis $x_{pen}$, $y_{pen}$, $z_{pen}$, and rotationally about each of these axes.

Thus, as described in detail below, the designer uses stylus 36 to draw lines in three-dimensional (3D) space and attach them to an object in the $CS_{object}$ system, the position and orientation of this object being controlled by the designer's movement of pad 32 (and thus sensor 20).

Sensors 22, 20 embedded within stylus 36 and the pad 32, as well as switch 50, also enable the designer to specify to computer 12 the task to be performed, as well as the information required to accomplish each task. In particular, the stylus 36 is used to select both new modes of operation and also provide information required to accomplish tasks.

The major task is to draw 3D lines and establish their position and orientation in work area 15'. Drawing information is provided by the position and movement of stylus 36 and pad 32. During this "drawing" mode of operation, a line is drawn by depressing and holding down button 50 and then moving stylus 36 in three dimensions in the desired shape of the line. Button 50 is released when the line is completed, and computer 12 responds by "capturing" the line in work area 15'.

Thus, when the designer draws a line with stylus 36, its shape corresponds to that followed by the designer in drafting the line. For example, if the designer draws a 3D spiral, computer 12 will create a 3D model of the spiral and display the line in perspective on display 14. During drawing, the location of the line drawn on display 14 is a function of the position and orientation of tablet 32 (and hence sensors 20, 22), and thus the designer is able to take advantage of the natural kinesthetic feedback provided by his or her hands when drawing.

It should be noted here that designing objects with system 10 uses a four step approach. First, 3D lines are created in work area 15' using stylus 36. Then, existing lines are modified as desired (e.g., by adjusting their shape, etc.) to obtain a skeletal outline of the shape of the object being designed. Next, surfaces are fit over the lines. Lastly, these surfaces are modified to develop the final shape of the object.

When creating lines, the designer may elect to take full advantage of the six degrees of drawing freedom that stylus 36 provides to draw totally unconstrained or "freeform" lines. With respect to their position and orientation in work area 15, such freeform lines actually possess seven degree of freedom: the x, y, z locations of each endpoint and the angular position of the line with respect to an axis connecting the endpoints. (Of course, the shape of the line is directly a function of the motion of hand held stylus 36 and, as such, all lines that are drawn possess numerous degrees of freedom in the shape domain.)

Alternatively, the designer is free to give up one or more of these position/orientation degrees of freedom and constrain the position and/or orientation of the line in one or more ways. This is done by utilizing one or more computational features (discussed in detail below) that are provided by CAD system 10 to aid in the design process. For example, the designer may, before drawing a line, prespecify the 3D locations in work area 15' of both endpoints. When the line is drawn, computer 12 automatically scales it to fit between these endpoints. As a result, the designer is left with only one degree of freedom—the angular rotation of the line with respect to the axis between the endpoints—to choose. (This is done by twisting stylus 36 along its longitudinal axis, as described in detail below.) A middle ground is to prespecify the position of only one line endpoint (thereby giving up only the three degrees of freedom associated with the x, y, z coordinates of that endpoint). The designer retains the ability to choose the four remaining degrees of freedom (by positioning stylus 36, and hence pen 42, at the desired other endpoint in work area 15' and specifying the rotation of the line, as discussed above).

The specification of tasks is also accomplished with stylus 36 and finger switch 50. Computer 12 recognizes two rapid successive presses of actuator 50 by the designer as a signal to exit the "drawing" mode and enter a "control of flow" mode. In this mode, the computer 12 maps the 3D motion of the stylus 36 in work area 15 to a more limited 2D motion of pen icon 42 on the screen of display 14. Computer 12 also displays palettes, pull down menus and graphical icons (discussed below, see FIGS. 3-11), for the system's features which are both highlighted and selected depending upon the screen location of pen icon 42 and state of actuator 50 over time.

While in the "control of flow" mode, computer 12 causes the 3D information flowing from stylus 36 to have a different effect upon the position of pen icon 42 on display 14. In the "drawing mode", the three dimensional position and orientation of stylus 36 (i.e., $CS_{stylus}$) causes $CS_{pen}$ and, hence, the virtual pen icon 42 to move in similar manner in the 3D virtual work area 15', with the location of pen icon 42 projected onto the 2D screen of display 14. In the drawing mode of operation, all three axes of motion of stylus 36 affect the position of pen icon 42 on the screen. However, in the "control of flow" mode, it is advantageous if only two of the axes of motion of stylus 36 affect the position of the icon of pen 42 on the screen, so that the position of the stylus 36 maps linearly into position on the display 14. The designer does not experience the effect of having to move the stylus greater distances in work area 15 when the stylus is nearer the screen than when it is farther away.

2. Detailed Discussion of Database and Picking

Computer 12 represents lines initially as sets of discrete points whose coordinates are measured with respect to a local coordinate system unique to each line $CS_{line}$ (FIG. 2). When a new line is created, the position and orientation of $CS_{line}$ is initially set equal to $CS_{object}$. As lines undergo rigid body transformations (described below), their coordinate systems $CS_{line}$ are repositioned and reoriented. Thus, the coordinates of individual points $(X_{line}, Y_{line}, Z_{line})$ on the line do not change when undergoing rigid body transformations (such as rotation, translation, and twisting about an axis, all of which are described below).

Computer 12 also maintains a number of 4×4 matrices for converting point coordinate information from a description relative to a first coordinate system to a description relative to a second coordinate system. These matrices contain an upper left 3×3 rotation component, and a lower left 1×3 translation component. Points whose coordinates undergo a transformation from one coordinate system to another (i.e., from coordinate system 1 to coordinate system 2) are arranged in homogenous form as a 1×4 row vector $(X_1, Y_1, Z_1, 1)$ which pre-multiplies a 4×4 matrix (denoted by [1_to_2], which indicates a 4×4 matrix to convert homogenous point coordinate information from a description relative to coordinate system 1 to a description relative to coordinate system 2). The resulting 1×4 column vector contains the coordinates $(X_2, Y_2, Z_2, 1)^T$ of the transformed point:

$$(X_1, Y_1, Z_1, 1) * [1\_to\_2] = (X_2, Y_2, Z_2, 1)^T$$

Computer 12 maintains (but is not limited to) the following 4×4 matrices and their inverses: [pen_to_world], [world_to_pen], [object_to_world], [world_to_object], [pen_to_object], [ref_to_object], [object_to_ref], [line_to_object], and [object_to_line]. These matrices are updated with each processed loop of the program run by computer 12 to reflect the changes (all or in part) in position and orientation of sensors 20 and 22.

Referring to FIGS. 2A-2C, the information reflecting the changes in position and orientation of sensors 20 and 22 is obtained from sensing system 16 by computer 12 in the form of two 1×6 vectors. Each vector contains the three x,y,z coordinate positions, as well as the three orientation angles azimuth about "z", elevation about "y", and roll about "x", of one of the sensors 20 or 22. Computer 12 uses the 1×6 vectors, along with several coordinate transformation matrices (FIG. 2A) to create the transformation matrices [pen to world] and [object to world]. The other matrices mentioned above are computed as inverses or products of existing matrices, or are created upon request by computer 12 in user specified functions described in detail below. An example of how computer 12 obtains the matrix [object to world] in the execution of each process loop of system 10 follows:

The upper left 3 × 3 rotation component of [object to world] =
    [Rot. by sensor 20 roll angle about "x"]*
    [Rot. by sensor 20 elevation angle about "y"]*
        [Rot. by sensor 20 azimuth angle about "z"].
The lower left 1 ×
    3 row translation component of [object to world] =

-continued

[x,y,z] position coordinates of sensor 20 plus horizontal offset 41.

Computer 12 plots items in the work area 15' using a hierarchical matrix stack to obtain the product of a series of matrices. Lines which are drawn by stylus 36 undergo a conversion, prior to being plotted, from a description relative to their own unique coordinate system $CS_{line}$ to a description relative to $CS_{object}$, followed by a similar conversion relative to $CS_{world}$, followed by a conversion to $CS_{viewer}$, and a projection onto a plane corresponding to the screen of display 14. $CS_{viewer}$ is defined to be the coordinate system of the user in virtual work area 15', and is chosen by computer 12 to coincide with an assumed position and orientation of the eyes of the designer in work area 15. The matrices shown in FIGS. 2A-2C are available in the graphics library provided by Silicon Graphics Inc., of Mountain View, Calif.

Prior to plotting a line on the screen of display 14, computer 12 obtains a total transformation matrix, defined as [line to screen], which is used to convert each point on the line into normalized screen coordinates. Computer 12 introduces the normalization of coordinates, (i.e., minimum value −1, maximum value 1), in the perspective projection matrix [viewer to projection plane] of FIG. 2C. Normalized screen coordinates allow computer 12 to scale the image properly to fit the dimensions of the display screen 14. Referring again to FIGS. 2B and 2C, the following matrix operation is performed by computer 12, prior to plotting a line, to obtain the matrix [line to screen]:

[line to screen] = [line to object]*[object to world]*
[world to viewer]*[viewer to projection plane].

In order to store the sampled points comprising lines, computer 12 maintains doubly linked lists called "point_lists" of point data structures.

The designer can select objects (i.e., lines, points on a line) in 3D without having to precisely position the stylus 36 in 3D within work area 15 by utilizing a "picking" function provided by system 10. Normally, the designer would have to place pen icon 42 in exactly the same three dimensional position as the target point before the computer could recognize a 3D match. In CAD system 10, however, picking is a "line of sight" operation in which the designer need only match the 2D screen coordinates of the target point and the icon of the pen 42 on the screen of display 14. This method of picking is easier for the designer since depth position of stylus 36 does not prevent the picking of entities in the virtual work area 15' which are either in "front of" or "behind" the 3D position of the pen icon 42. The terms "in front" of and "behind" are here defined to mean not in the same plane as the view plane of display 14.

In order to perform this "line of sight" picking, computer 12 encodes the color information of the pixels of the screen of display 14. The pixels are interpreted by computer 12 after the designer has executed a "pick". The following is a description of how the numbers identifying drawn entities are first loaded into the color vectors, which are assigned just prior to drawing.

When entities are drawn on display 14 by computer 12, they are assigned a color just prior to being displayed. This color information is used to additionally store numbers that identify individual drawn entities. The entities still have colors, but part of the color information is reserved to store extra numbers in binary form. These binary numbers are stored in unused portions of the 4 bytes of color space (32 bits) allocated to each pixel on the display 14. For example, the blue intensity byte stores the line number (if any) of the entity being drawn. Thus, the 25th line would be drawn with a binary 25, for example, in its blue intensity byte. In addition, the fourth, non-RGB (Red/Green/Blue) byte (called the alpha byte) is used to store the binary number associated with the point number of the entity. The red and green intensity bytes are loaded with almost maximum intensity. As a result, entities drawn in this manner appear to be between yellow and white. For example, computer 12 assigns the color (11111110 11111111 00101010 01000110)
for (Red,Green,Blue,Alpha)

to the seventieth point (i.e., 01000110) on the 42nd line (i.e., 00101010). The red intensity is set to 254 only to further distinguish the pixels that contain entity number information. Entities that are color-coded with their reference numbers are not subject to interaction with the built in lighting models. When using lighting models, computer 12 may change the color in certain places such as where a highlight or shadow may appear.

Once the colors of pixels on display 14 have been encoded, computer 12 performs picking in the following manner. When the designer actuates pushbutton 50 on stylus 36, the current screen coordinates of pen icon 42 are computed. With these screen coordinates, computer 12 examines the 32 bit color vector of the pixel located at these screen coordinates to determine from the red and green values if there is an entity drawn at that pixel. If so, computer 12 determines the line and point numbers to make a match.

In executing a pick as described above, computer 12 first examines the pixels in a small box of pixels (e.g., containing 5×5 pixels) centered at the screen coordinates of the pen tip 42. If computer 12 determines that no pixels within that box are encoded with numerical information, computer 12 then examines the "frame" of 8 similar pixel boxes surrounding the center box. Successive failures to find a "hit" will cause the computer 12 to continue searching larger "frames" of boxes surrounding the already checked interior boxes. Computer 12 maintains an adjustable threshold of 5 "frame" examining iterations before terminating a pick with no "hit".

3. User Interface

Referring again to FIG. 1, computer 12 provides a menu and palette system 90 to allow the designer to control the program when in "control of flow" mode. As discussed above, the designer enters this mode of operation by making two rapid successive presses of finger button 50. The designer then positions the pen 42 within menu and palette system 90 and selects a function. Following the selection of a function, the program automatically reverts to the fully three dimensional "drawing" mode of program operation, which allows the designer the freedom to communicate three dimensional information.

Referring also to FIGS. 3-7, menu and palette system 90 is shown in detail. It consists of two types of controls—pull down menus selected from menu bar 92 and a set of palettes 94-98. Menu bar 92 is continuously displayed across the top of the screen and provides access to pull down menus 99-102, one for each of the entries "File", "Edit", "Group" and "Settings", respectively. A pull down menu 99-102 is displayed on the screen when the corresponding entry on menu bar 92 is selected. Access to the pull down menus is gained by positioning pen icon 42 over the corresponding menu bar entry and pressing actuator 50.

Having selected an entry and accessed one of pull down menus 99-102, the designer is free to select an item from the accessed pull down menu. Item selection is accomplished by using the stylus 36 to move the pen 42 within the pulldown menu while the actuator 50 is depressed. As pen 42 tracks through the items, they are highlighted. A menu item is selected by releasing actuator 50 while the pen 42 is within that item.

For example, the "file" entry, when selected, causes menu 99 (FIG. 4) to be displayed. Menu 99 allows the designer to, e.g., clear the current database from the program ("New") to start a new design, or access a list of files that contain data for currently existing models ("Open"). The designer can also save the current design under a name previously assigned by the designer ("Save"), or under a new name ("Save As . . . "). The designer can also obtain information about the operation of the system by selecting "About 3-Draw". The design session is ended by selecting "Quit".

Selection of the "Edit" item on menu bar 92 causes pull down menu 100 (FIG. 5) to be displayed. The options available in this menu are to "Undo", i.e., cancel, incorrect commands, or "Select All", which causes all items in the 3D model to be selected and highlighted so that subsequently entered commands will globally affect all of these items. This option allows the designer to, e.g, translate (a procedure discussed below) the entire model with a single command.

The "Group" item is selected from the menu bar when the designer wishes to specify separate items (such as connected lines) to be affected as a group by a function The "None" selection in submenu 101 (FIG. 6) removes a previously imposed group designation. The designer can specify that the junction or joint between grouped lines behave as a "ball and socket" joint to pivot when and one of the lines in that group is manipulated. Conversely, the joint can also be required to remain "rigid" as one or more grouped lines are moved.

The designer can also access a "Settings" submenu 102 (FIG. 7) to make adjustments to various parameters of the stylus and the display. A "check" displayed with an item in submenu 102 denotes that item is active (i.e., on). Each time an item in the upper portion of submenu 102 is selected, its setting is toggled (such as from off to on). Thus, the "pen" icon 42 can be turned on and off, as can the display of tablet 40 and floor 43. The data points on the lines drawn by stylus 36 can be displayed or masked using the "Dots" selection. Shadows cast by the lines on floor 43 and tablet 40 can also be activated or inhibited with the "floor shadows" and "tablet shadows" items, respectively. Reflection planes (described in detail below) can also be displayed, or not, by toggling the "reflection planes" item.

The "precision" item in the lower portion of submenu 102 is not a toggled item. It controls the number of line segments that are created between successive points on a line. By increasing the precision, the smoothness of a line segment is increased, because the line is interpolated with a greater number of line segments When "precision" is selected, a window (not shown) is displayed that contains a number indicating the current precision value. This value is then increased or decreased as desired (e.g., through keyboard entries or using stylus 36 to actuate "up" or "down" arrows that are displayed alongside the value)

Referring again to FIG. 3, the second type of control is implemented with palettes 94-98, five types of which are: "Create" (94), "Rigid Body Move" (95), "Deform" (96), "Delete" (97), and "Primitive" (98). A greater or lesser number of palettes may of course be used. palettes differ from pull down menus in that they are always visible on the screen and hence are continuously available to give visual cues to the designer. Palette selections are made in the "control of the flow" mode using stylus 36 to position pen 42 over and highlight an item in the palette A single press of actuator 50 serves to select the highlighted item and return the program to full three dimensional "drawing" mode. The program will then be ready to implement the function selected.

Referring also to FIGS. 8-11, with some palette items (e.g., the "freeform draw", "translate", "displacement gun", and "polygon" items shown in these figures) the designer is permitted to configure certain features of the item, shown in "information boxes" 104, 110, 121 and 122, respectively. When in the "control of flow" mode with pen over an item on a palette, two rapid successive presses of actuator 50 causes the information box for that palette item to be displayed. Information boxes 104, 110, 121 and 122 are discussed in detail below with their associated palette items.

Figure 3:
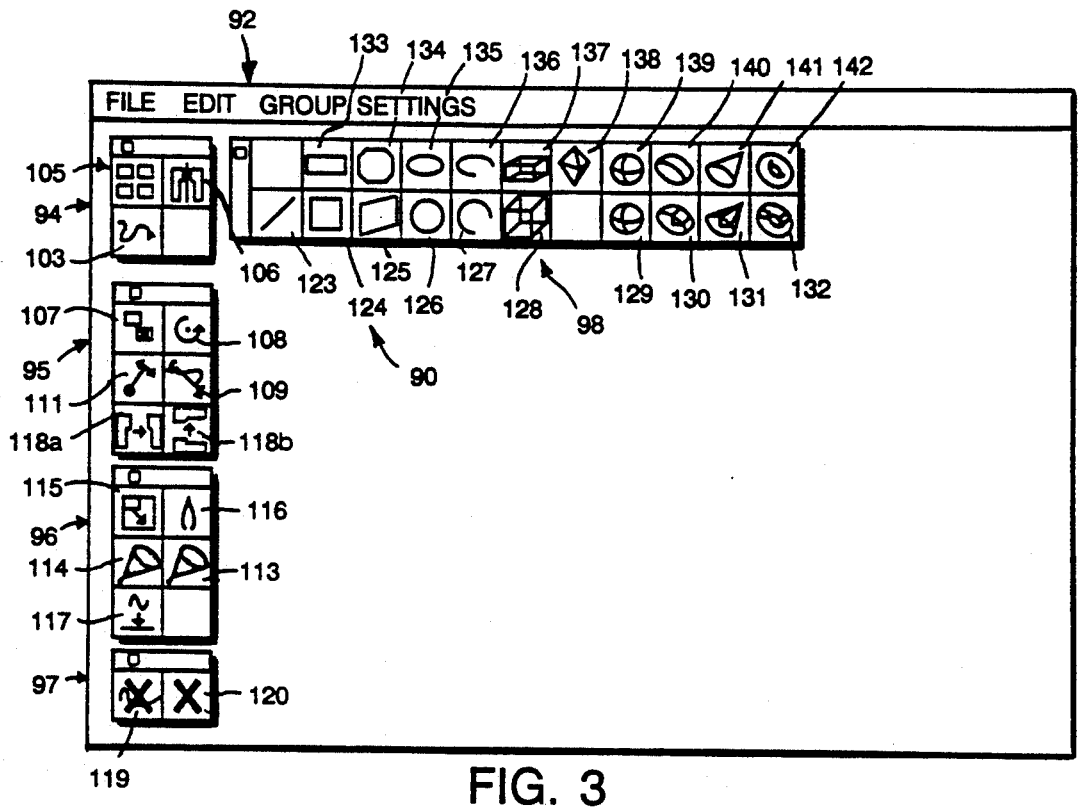
FIG. 3 illustrates a menu bar and palettes displayed in the CAD system of FIG. 1.
Figure 4:
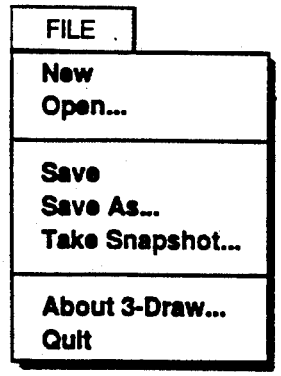
FIGS. 4-7 show menus that are displayed when various items of the menu bar of FIG. 3 are selected.
Figure 5:
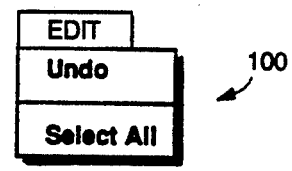
Figure 6:
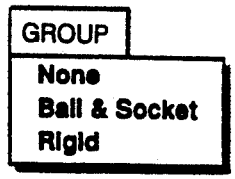
Figure 7:
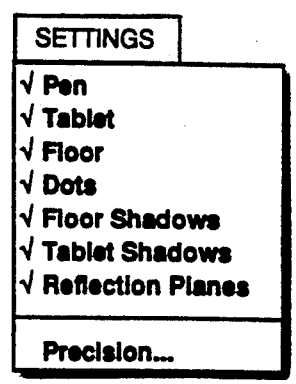

Referring also to FIG. 3, lines (either "freeform" or "constrained"—discussed above) are created by selecting the "freeform" item 103 from create palette 94. Whenever freeform item 103 is selected computer 12 by default assumes that the designer will draw an entirely freeform line (using all seven degrees of freedom discussed above) unless the designer also prespecifies some constraints (e.g., one or more endpoints) before beginning to draw the line.

In the default mode (FIG. 8) of "freeform curve", the designer can start the curve at any point in space (by pressing and holding down finger button 50), draw a curve of any shape, size and orientation, and end it at any point in space (by releasing button 50). The final location of the line drawn with activated stylus 36 is a function solely of where in space the line is drawn with the stylus 36 with respect to sensor 20 on pad 32. That is, the position of the line that is drawn is not restricted by the positions of any other lines that have been drawn. This mode of operation is often used to create the first few lines for the object, before even a rough outline has been drawn.

Freeform lines are drawn either by "pen walking" or by "dual walking". In the "pen walking" mode, line drawing on display 14 is inhibited whenever the designer does not move stylus 36, even if the designer is moving the pad 32. This allows the designer to begin drawing a line and turn pad 32 (and hence the object attached to the pad and which is being modeled) to visualize what the line looks like from another direction, without inadvertently continuing to draw the line while viewing this new perspective. Drawing is inhibited without having to deactivate stylus 36 (i.e., release button 50), provided that the stylus 36 is held motionless.

In the "dual walking" mode, however, drawing with active stylus 36 continues when the designer rotates or otherwise moves pad 32, even if stylus 36 is not moved.

Thus, drawing is performed when both stylus 36 and the object being modeled are being moved, thereby giving the designer the sensation of working with both hands to three-dimensionally draw the object, and providing concomitant kinesthetic feedback during drawing.

As discussed above, the designer is also given an option to draw freeform curves under a "constrained" mode of operation. The purpose of the constrained line is to allow the designer to specify, with varying degrees of particularity, where a line will be located, how the line will be oriented, and/or the scaling of the line, prior to actually drawing the line with stylus 36. This greatly facilitates the designer's task of drawing the line, especially if the shape of the line is complex (such as a curve) or critical, because the designer is freed from the added task of drawing the line within certain existing parameters, e.g., to fit within a selected pair of endpoints with the proper degree and uniformity of shape. Some types of constraints may be specified from within the default mode of freeform curve, while others must be specified by bringing up the information box 104 (FIG. 8) for the curve.

The basis of the constraint mode of operation is the fact that a curve may be specified by characterizing its shape in combination with seven degrees of freedom. Six degrees of freedom are needed to specify the position and orientation of any rigid body, including a curve. In addition a degree of freedom is needed to specify the scale of the curve. Thus, shape plus seven degrees of freedom determine a curve in space. The seven degrees of freedom needed can be specified in a wide variety of ways. Constraints are a means of predetermining one or more of the degrees of freedom prior to drawing the curve.

An example of a constraint that is available within the "default mode" of freeform curve item 103 is preselecting both endpoints of the line. The designer does this by sequentially indicating the desired starting and ending points for the curve to be drawn by positioning pen icon 42 over two points in the 3D volume of work space 15' (e.g., two points on one or more already existing lines) and pressing actuator 50 once to signify each point. The two endpoints are then highlighted, e.g., with a green color indicating the starting point and a red indicating the ending point. The designer can now draw the line anywhere in the space of work area 15, and upon completion of the drawing operation, as signaled to the computer by the release of depressed actuator 50, the computer repositions the line to conform to the preselected constraints. In the case of the "both endpoints" constraint, the line is rescaled so that it fits between the predetermined endpoints and it is "snapped" (i.e., suddenly relocated) into place.

The specification of both endpoints determines six of the seven available degrees of freedom. The designer still controls the seventh degree of freedom—angular position about an axis containing the endpoints—and adjusts it by twisting stylus 36 in the desired direction. When the designer is satisfied with the line's orientation, button 50 is depressed one last time, fixing the position of the line.

Another example of constraints that may be applied within the default mode of freeform curve item 103 is to preselect one endpoint of the line. The designer selects one 3D point within the work area (e.g., a point) on an already existing line) by highlighting the point with pen icon 42 and depressing finger button 50 once. As a result, three of the seven degrees of freedom for the line are prespecified. The designer can now draw the line anywhere in the 3D space of work area 15, and upon completion of the drawing operation, as signaled to the computer by the release of depressed actuator 50, the computer automatically repositions (i.e., snaps) the line so that is starting point is moved to the preselected point. Stylus 36 is automatically assigned to control the position of the second end point of the line, as well as its angle of twist about the line connecting the two endpoints, thus allowing the designer to specify the remaining four degrees of freedom. A last press of the actuator 50 locks the curve into the desired position and orientation.

Figure 8:
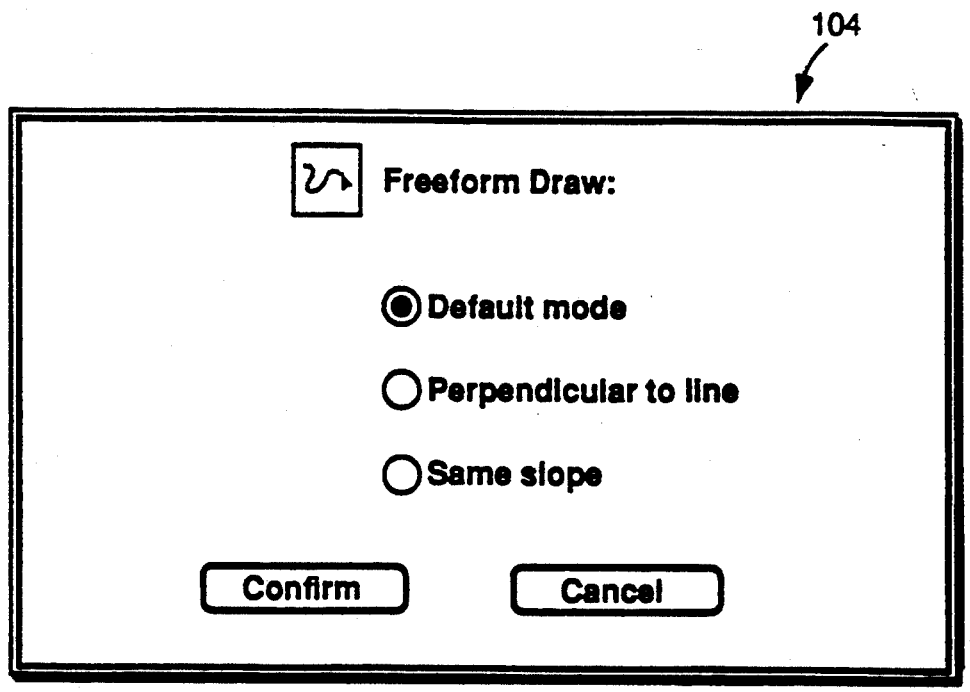
FIGS. 8-11 depict information boxes that are displayed when various items of the palettes of FIG. 3 are selected.

Referring to FIG. 8, the designer can specify other types of constraints that are not available in the default mode by calling information box 104 which lists, e.g., two other types of constraints, "perpendicular to line" and "same slope". Selection of either type of constraint is made by highlighting it with pen icon 42 and depressing button 50 once.

For example, consider the use of the "perpendicular to line" constraint. After selecting this constraint, the designer next selects a point on an already drawn line by positioning pen 42 over it and pressing actuator 50. By so doing, the designer has specified three degrees of freedom of the next line to be drawn, by locating the endpoint of the line, and one more, by constraining it to be perpendicular to the selected line at the selected point The designer can now draw the curve anywhere in work space 15 and upon completion of the drawing operation, as signaled to the computer by the release of depressed actuator 50, the computer repositions (snaps) the line such that the predetermined constraints are satisfied. At this stage the user specifies the remaining three degrees of freedom by specifying the angular orientation of the line around the specified line, the twist of the just drawn line, and the scale of the line using the stylus 36.

When the "same slope" constraint is preselected from information box 104, the designer follows the same steps as those described above to create a line that is tangent to the preselected line at the preselected point.

Referring again to FIG. 3, often, a three-dimensional drawing includes many lines that are identical. To relieve the designer of the burden of drawing these lines individually, and thereby avoid the risk of drawing some, if not all, of the lines differently, the designer may draw a line once (i.e., as a master line) and then copy it by selecting the "copy" item 105 from palette 94. The designer first draws the master line and places it at the desired position and orientation on the drawing Then, the "copy" mode is selected and the designer positions icon 42 using stylus 36 at any point on the master line. The master line is "captured" by depressing button 50 once. A reproduction of the line appears attached to pen icon 42, and the designer repositions icon 42 to another location on the drawing by moving stylus 36. When the desired location has been found, pushbutton 50 is released, and the replica of the master line is deployed on the screen.

Many three-dimensional objects are symmetrical about a plane. That is, the shape of the objects on either side of a reflection plane are identical. System 10 makes use of this symmetry by allowing the designer to specify a reflection plane by selecting "reflection" item 106 from palette 94. When the reflection item is selected, a translucent, colored plane appears on display 14. The designer controls the three-dimensional position and orientation of this reflection plane by pressing and holding down button 50 and moving and rotating stylus 36 in the direction and orientation that he wishes the reflection plane to be moved. (A detailed discussion of this procedure appears below). When the desired position and orientation are obtained, the refection plane is frozen in place by releasing button 50. Then, the designer selects which line or lines that have already been drawn on display 14 to be replicated and reflected about the reflection plane. This is done by positioning icon 42 on any point on the line using stylus 36 and depressing button 50 once. After this is done, the reflected lines appear on the display.

Lines can be manipulated as rigid bodies by selecting functions from "rigid body move" palette 95. A line is rotated by selecting rotation function 108. When the "rotation" mode is selected, the line on which symbol 42 is positioned (using stylus 36) is rotated simply by twisting stylus 36 about its tip. The line is rotated about the point on the line on which icon 42 rests, and the line rotates in a similar manner to the way in which the stylus rotates about its tip when the designer rotates his hand. (The rotation procedure is described at length below.)

A line may also be rotated or twisted about the axis defined by it endpoints by selecting axis twist function 109 from palette 95. The line to be twisted is then selected by picking, and the angle of twist is determined by the amount of rotation about the longitudinal axis of the stylus while holding button 50 down. When the desired rotation has been imparted, the designer freezes the line in place by releasing button 50. (The axis twist procedure is also described in detail below).

Figure 9:
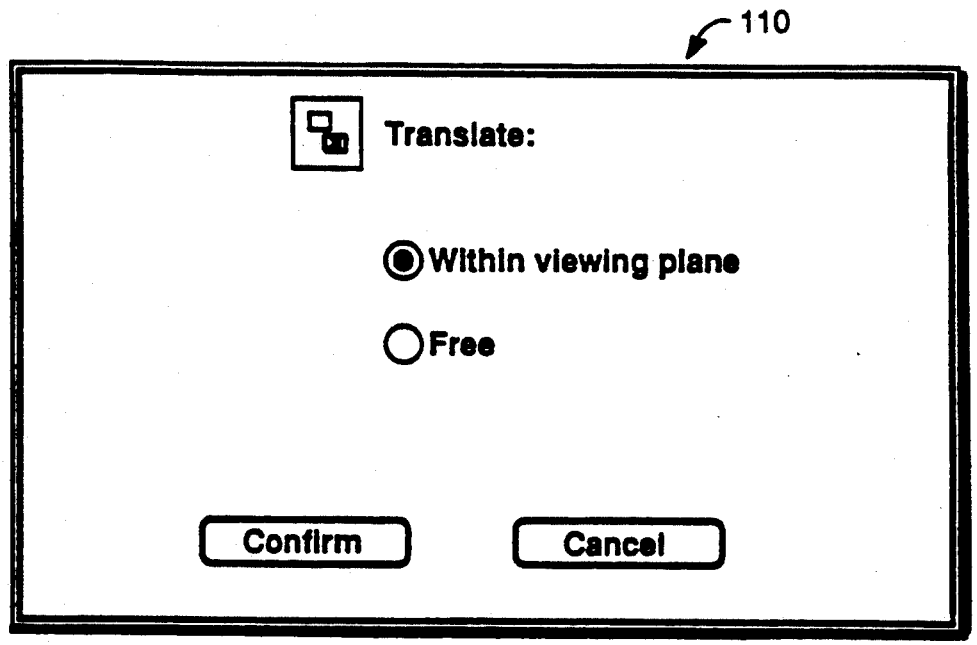

Referring also to FIG. 9, a line can be translated without affecting its angular orientation using the "translate" function 107. The designer selects the line to be translated (i.e., moved in a direction parallel to the viewing plane) by picking. When the translate function has been selected, an information box 110 is displayed to allow the designer to select the direction of translation to be either "within the viewing plane" or to be "free" to move in three dimensions. While translating the line, the object can be moved to obtain full 3D translations. (A detailed discussion of the "translate" function is provided below.)

Referring again to FIG. 3, a line may rotated about a point which corresponds to one of the line's endpoints by selecting the "ball and socket" function 111. The designer selects a line to be rotated about one end by picking. The computer 12 selects the "free" end of the line as the one closest to the pen icon 42. The other end of the line is constrained in position only. The rigid body rotation of the line about the fixed end is specified by the amount of directional displacement of the stylus 36 as the designer moves his hand. Computer 12 also specifies the angle of twist about the axis joining the line's endpoints to be similar to the twist of the stylus 36.

The designer can also "flip" lines about either a preselected vertical plane or a preselected horizontal plane by invoking flip items 118a, 118b, respectively, from palette 95. The flip plane is manipulated using stylus 36 in the same manner as described above for reflection item 106. When the plane has been positioned as desired, the line to be flipped is selected by picking, and the line is physically moved (as a rigid body) to the opposite side of the plane. The flip function differs from reflection in that the line is moved, rather than simply being copied.

Figure 11:
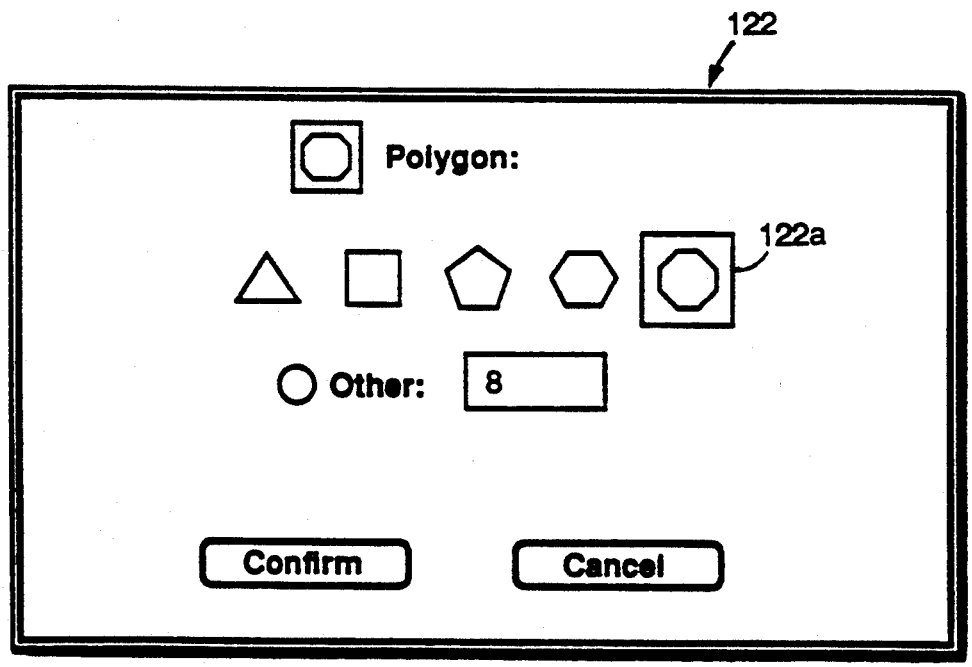

Referring also to FIGS. 11, 11A and 11B, lines can be deformed by selecting functions from "deform" palette 96. One way of deforming a line is with the "displacement gun" function 113 of palette 96. "Displacement gun" item 113 allows the designer to use stylus 36 and pen icon 42 as a tool (akin to an airgun) for moving points on a line. In the "displacement" mode, a target volume 174 (FIG. 11A) in the shape of, e.g., a cone, is displayed projecting from the tip of icon 42 in the direction in which stylus 36 is pointed. The stylus is manipulated to highlight one or more points 176 on a line 178 displayed on the screen. The "airgun" is activated by depressing button 50 and holding it down for as long as the designer wishes points to be displaced. While button 50 is held down, the highlighted points are moved in the direction in which stylus 36 (and hence symbol 42) is pointed (FIG. 11B).

Figure 10:
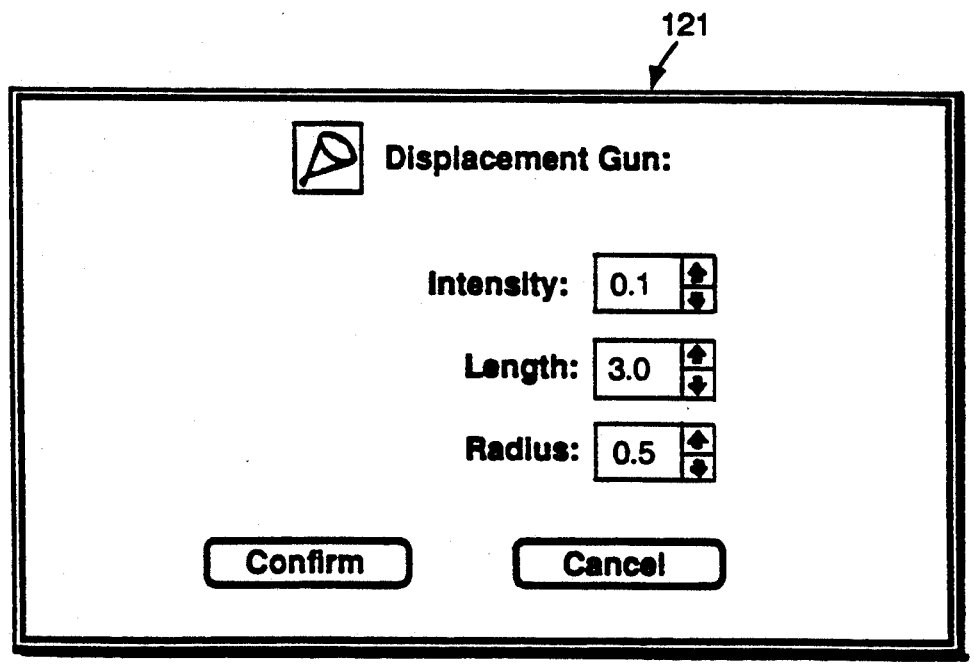

Referring also to FIG. 10, the designer can change the shape (e.g., the length and radius) of target volume 174 using information box 121, which is displayed when displacement gun item 113 is selected. The intensity of the airgun can also be adjusted using information box 121. These items are increased or decreased by highlighting the "up" or "down" arrow adjacent the item while holding button 50 down. The amount of displacement can also be prespecified to be constant within target volume 174 (as in FIGS. 11A and 11B) or a function of the distance of a point 176 from the tip of symbol 42. For example, points 176 located nearer to the tip may be displaced by greater amounts than points 176 positioned farther away. The designer can also specify global displacement of all points that are located in the direction in which target volume 174 is pointed.

Computer 12 models the lines drawn by the designer as physical models of elongated bodies in accordance with principles discussed in detail below. This permits the designer to deform these curves by utilizing force gun function 114 from palette 96. The procedure followed by the designer is the same as that described above for displacement gun function 113. During operation of force gun function 114, stylus 36 (and pen icon 42) functions as a type of airbrush which sprays quantities of force in the direction in which the designer points stylus 36. The dispersion of the force quanta may be controlled using an information box (not shown) similar to box 121 (FIG. 10) for displacement gun function 113. The force gun function 114 differs from displacement gun function 113 in that by using force gun 114 the designer may apply loads to physically modeled curves (or surfaces fitted about curves), thereby deforming the curves in a controllable manner while maintaining smoothness in accordance with the simulated physical properties of the curves (or surfaces).

Referring also to FIGS. 11C and 11D, the tip of stylus 36, as represented by symbol 42, can also be used as a tool analogous to a pair of tweezers to grab points on existing lines and reposition them as desired, by actuating tweezer function 116 in palette 96. The tip of icon 42 is positioned on the point 184 to be grabbed on a line 186, and button 50 is depressed once. Moving stylus 36 causes point 184 to be pulled in the direction of movement, as shown in FIG. 11D, thereby displacing nearby points 188 and line segments between point 184 and points 188. The designer can prespecify the amount by which neighboring points move in response to movement of point 184.

A line can be scaled by invoking the scale function 15 from palette 96. The amount of scale is determined by a horizontal motion in the direction normal to the viewplane by stylus 36.

A curved line may be deformed to a straight line through the selection of "straighten" item 117 from palette 96. The line to be straightened is then selected by picking. This function removes, e.g., minor deformities in a line caused by unsteady movement of stylus 36 during drawing.

Existing lines or points on lines can also be deleted by entering a "delete" mode from palette 97. A line is deleted by selecting function 119, and a point is deleted with function 120. When a line is to be deleted, it is selected by positioning pen icon 42 on a point on the line using stylus 36. When button 50 is depressed, the selected line is removed from display 14. Alternatively, the designer can specify that only a portion of the line to one side of the point is to be deleted, or that only the highlighted point is to be removed (thereby dividing the line into two parts). These selections are made, for example, with the aid of information boxes (not shown).

Primitive palette 98 allows the designer to create a number of primitive shapes, both two and three dimensional 123-142. The two dimensional shapes include straight lines 123, squares 124, trapezoids 125, circles 126, arcs 127, rectangles 133, ovals 135, as well as other polygons 134. The three dimensional primitives include cubes 128, spheroids 129 or portions of spheroids 139, cones 131, 141 tori 132, 142 and polyhedra 138. Other primitive shapes are also available, as shown.

Referring also to FIG. 11, some primitive shapes (e.g., polygon 134) allow the designer to select from a set of shapes using an information box 122. The currently selected shape is highlighted by a square 122a. Selection of a shape is made by moving stylus 36 to highlight the available shapes (e.g., triangle, square, pentagon, hexagon) and releasing button 50 to make the selection. Invoking the "other" item in box 122 permits the designer to increment or decrement a displayed number (e.g. 8) to select additional shapes (e.g., an octagon).

When the designer selects a primitive shape from palette 98, the shape is displayed on the screen with a predetermined size. The size of the shape can be increased or decreased by scaling. The primitive shape is positioned and oriented in the same manner as has been discussed above for lines drawn with stylus 36. Pen icon 42 is positioned over a point on the shape and button 50 is depressed. Then, the designer moves the shape by moving stylus 36; button 50 is depressed again when the shape is in the desired position. The shape is rotated or twisted as has been described with button 50 held down. When the proper orientation is achieved, the shape is locked in position by releasing button 50.

Some primitive shapes, for example primitive lines (123), can be further defined by the designer using submenus or information boxes which are displayed when the primitive is selected from palette 98. For example, the selection of a primitive line causes a submenu (not shown) to be displayed, which contains a number of entries that provide the designer with varying degrees of flexibility in specifying the location of the primitive line.

The primitive line's location can be specified with two endpoints. When this option is selected, the designer identifies the endpoints by moving pen icon 42 sequentially to the two locations momentarily depressing button 50 at each such location. When button 50 is depressed at the second endpoint, the primitive line is instantly displayed as a straight line between the endpoints.

The designer can alternatively specify the location of the primitive line by identifying a point on the line, the plane in which the line will lie, and the length of the line. Stylus 36 is moved to position icon 42 at the desired starting point, and pushbutton 50 is depressed. The plane of the line is then displayed, and stylus 36 is moved until the plane is oriented as desired; the location of the plane is fixed by depressing button 50. The line length is then set by moving icon 42 the desired distance from the line's starting point and depressing pushbutton 50. When all these steps have been taken, the primitive line is displayed at the selected position and with the selected length.

Another alternative available for positioning a primitive line is by a point, direction and length of the line. The starting point and line length are selected in the same manner as above. The direction of the primitive line is specified according to the longitudinal axis of stylus 36 (i.e., the $x_{stylus}$ axis, FIG. 2). The stylus is pointed in the desired direction, and the direction is selected by depressing button 50 once.

4. Visual Display Techniques

Computer 12 uses several depthcueing techniques to provide visual information to the designer of display 14 about the positions and orientations of objects in virtual work area 15'. The first depthcueing technique employed by computer 12 is real-time animation of a perspective, light-modeled view of virtual work area 15' in conjunction with z-buffering, a conventional algorithm that blocks the display of model elements that are obscured by other elements. Thus when the user creates and edits 3D lines through the use of 3D input sensors 20 and 22, the graphical image of a viewed 3D line or other object represented by computer 12 in virtual work area 15' is obscured when it passes behind part of another object or line, or below floor 43, providing the viewer of display 14 with some information about 3D location within virtual work area 15'.

To provide the designer with additional visual information on the positions and orientations of pen 42, and drawn 3D lines in the virtual work area 15', computer 12 projects shadows of the pen 42 and drawn 3D lines onto the floor 43, and the virtual tablet 40. The relative positions of the shadows of the pen 42, and the drawn 3D lines assist the viewer of display 14 in positioning and orienting lines.

3D lines can be represented by computer 12 in virtual work area 15' as groups of rectangular polygons. (This function is selectable by the user from a menu similar to the submenu in FIG. 7.) These groups of polygons are positioned and oriented in space so that they form "tubes" which surround the drawn 3D lines. These tubes may have, as an example, four sides, and have constant diameter about the lines in 3D space. The visual appearance of the perspective (or orthographic) projection of these "tubes" on the screen of display 14 causes certain lines, rendered with these "tubes", to be "thinner" than other lines. Lines are rendered "thinner" and "shorter" on the screen of display 14, when the distance measured between a line and the "observer's viewing point" in the virtual work area 15' increases. The "observer's viewing point" is the computer's 12 representation of the location of the designer in the virtual work area 15'. The location of the designer in the virtual work area 15' (specified with respect to the world coordinate system $CS_{world}$) is chosen by the computer 12 to coincide with the location of the designer in work area 15.

3D lines that are rendered with "tubes" described above appear to the viewer to become thinner as they recede from the viewplane of display 14 into the virtual work area 15'. The visual effect is similar to how physical entities would appear in the real work area 15. Additionally, computer 12 displays planar polygonal disks spaced at equal intervals along these lines that have orientations normal to the direction of the lines. (This function is selectable by the user from a menu similar to the submenu of FIG. 7.) These disks also provide visual information to the designer that illustrate the amount of curvature along 3D lines. The disks provide depth information within the virtual work area 15' by becoming smaller when they recede in a direction normal to, and away, from the viewplane of display 14. In addition, direction information is obtained by the orientation and apparent spacing of the disks.

Another technique used by computer 12 to visually indicate the distance of objects, measured in the direction normal to and away from the viewplane of display 14, is "intensity queueing". Computer 12 performs "intensity queueing" by varying the intensity of the colors to render lines. The intensity of a color is a measure of the "brightness"; the lowest intensity is black. The portions of 3D lines which are further away from the screen of display 14, as measured in the direction normal to the viewplane, are displayed visually less intense to the viewer and, hence, are darker and less well defined than portions of 3D lines which are closer to the screen as measured in the manner described above. This technique enables computer 12 to provide visual information compatible with the accommodation optical effect, present in normal vision, in which the eye automatically brings into focus only objects of interest.

System 10 may also display a stereo image of the virtual work area 15'. Stereo imagery provides the viewer with intuitive depthcues. The operating principle for stereo displays is that in normal vision there is some binocular disparity between the views obtained by each eye that conveys depth information. A stereo display monitor and some form of eyewear, such as that provided by Stereographics Corp. of San Rafael, Calif., can provide similar binocular disparity with a 2D screen by displaying time synchronized left and right eye views of the image. This depthcue has been found to contribute appreciably to clear computer/user communication for users of system 10, working especially well in conjunction with real time animation of objects in the virtual work area 15'.

One drawback of commonly available stereographic displays is that they assume a fixed eyepoint. Experiments with helmet mounted displays that track the viewer's eyepoint and update the display accordingly have shown great promise in overcoming this limitation. Such technology, when it comes to the fore, would be ripe for inclusion in system 10. Similar comments may be made with regards to the state-of-the-art in computer generated holography, although greater progress needs to be made in this field.

5. Detailed Description of Line Drawing

Figure 12A:
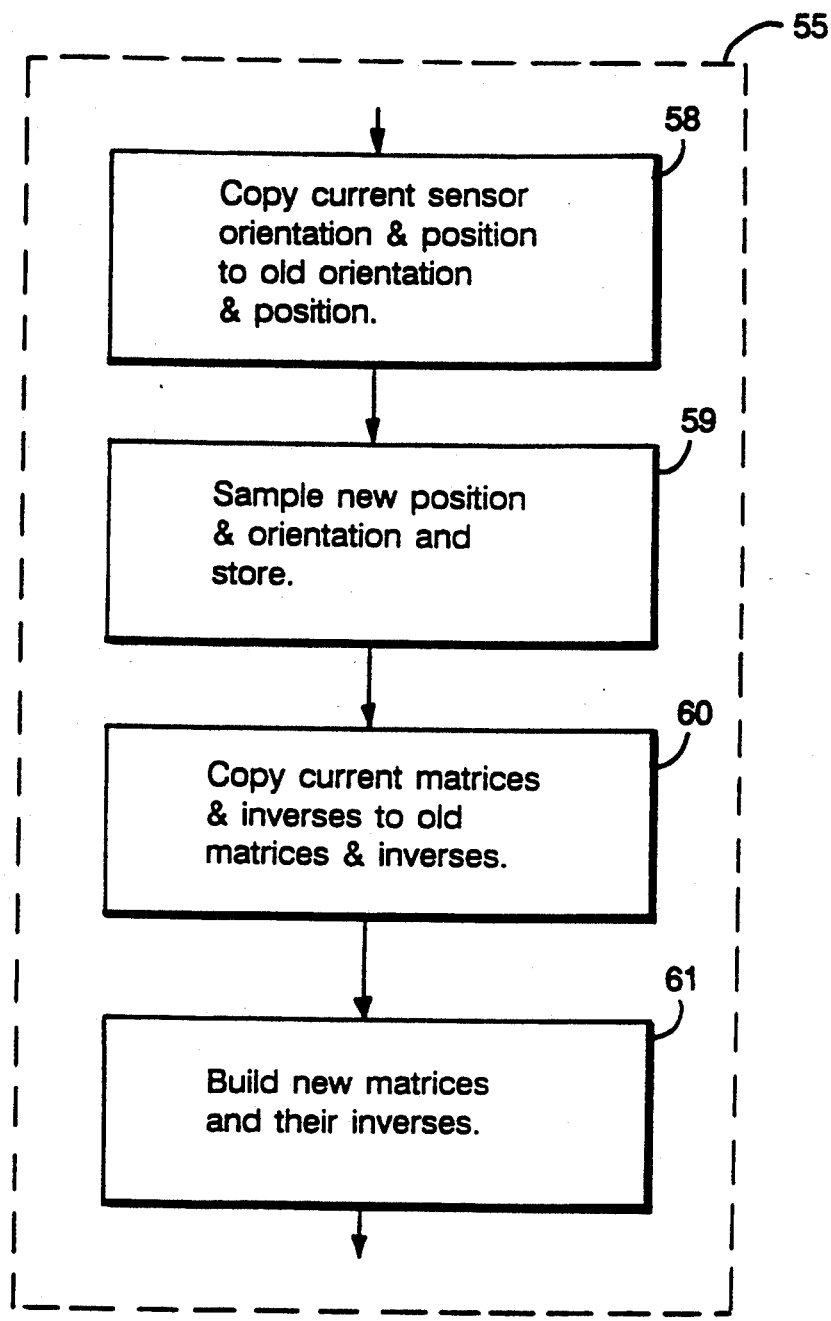
FIGS. 12A and 12B are a flow chart of the steps taken by the CAD system of FIG. 1 to draw a line.
Figure 12B:
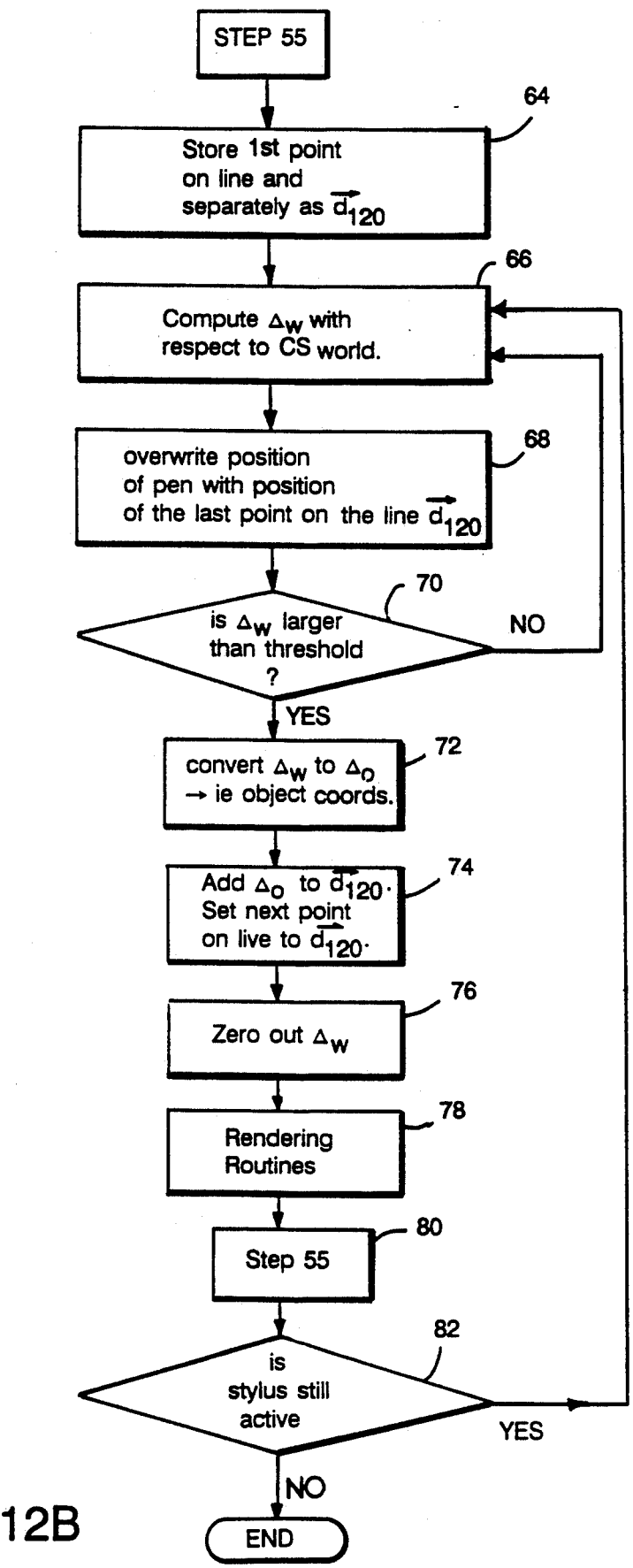

Referring to FIG. 12, there follows a detailed description of the "pen walking" mode (discussed above) for drawing a freeform line that is unconstrained to "snap" to any pre-specified constraints. The drawing process is started by actuating actuator 50 on stylus 36 (e.g., by depressing and holding down the pushbutton). Computer 12 then produces 3D lines on display 14 that replicate the designer's movement of stylus 36 in three dimensions in work area 15. Actuator 50 is deactivated from line drawing by releasing the pushbutton, which causes computer 12 to stop creating the line in response to further movement of stylus 36. Thus, the designer is able to take a break from drawing lines on display 14, or discontinue drawing one portion of the object and begin drawing in another region, simply by deactivating stylus 36 and activating it again when ready.

When the stylus is activated, computer 12 begins to loop through the following process (the detailed steps of which are shown in FIG. 12 and discussed below) until the stylus is deactivated: 1) determine if the stylus has been moved enough to warrant adding a new point; 2) if so, store the coordinates with respect to $CS_{object}$ in point data structure (and optionally store the orientation of $CS_{pen}$); 3) overwrite the lower left 1×3 translation component of matrix [pen_to_object] with the coordinates of the last point in the line; and 4) plot the contents of the work area 15'. Step 3 allows the designer to move the pad 32 and view the object and new line being created in such a way that the pen 42 moves with the object (but does not draw) even if the stylus 36 is held still during the drawing process In each process loop, computer 12 captures and processes the data output from sensing system 16, consisting of approximately 60 records per second of the 6 degree-of-freedom position and orientation data from sensors 20, 22, and alternating from one sensor to the other.

Computer 12 initiates the drawing process by copying the current 1×6 vectors of orientation and position data from sensors 20, and 22 to old 1×6 vectors (58). Next, computer 12 stores the new 1×6 position and orientation vectors from sensors 20 and 22 (59). Computer 12 then copies the matrices [pen_to_world], [object_to_world], and [pen_to_object] to [old_pen_to_object], [old_object_to_world], [old_pen_to_object], and their respective inverses to old inverses (60). Computer 12 builds new matrices which for those copied in step 60 using all or part of the new 1×6 vector information stored in step 59 (61). For the sake of simplicity, steps 58 through 61 are collectively known as step 55 (see also box 80 in FIG. 12 and FIGS. 13, 15, and 18).

Next, the coordinates for the first point of the new line are obtained from the lower left 1×3 row vector from matrix [pen_to_object]. These coordinates describe the current tip of the pen 42 with respect to $CS_{object}$. The coordinate information is stored in vector $[d_{120}]$, as well as in the first entry of a temporary array designated to hold point data for the new line (64). Note that computer 12 stores the first point and all subsequent points on the new line with respect to $CS_{object}$ because $CS_{line}$ is initially set identical to $CS_{object}$.

After storing the first point, computer 12 measures the change in the location of the tip of pen 42 by subtracting the lower left 1×3 row vector of matrix [pen_to_world] from the lower left 1×3 row vector of matrix [old_pen_to_world]. This quantity is added to the 1×3 vector called the "delta translation" or $\Delta_w$ (66). Next, computer 12 overwrites the lower left 1×3 translation component of matrix [pen_to_object] with $[d_{120}]$ (68). This causes the pen 42 to assume the position of the last point drawn, while still maintaining the orientation of stylus 36. (If step 68 were omitted, pen 42 would not follow the line being drawn when the object was simultaneously moved; rather, the pen's location 42 would follow the position of stylus 36 as it normally does when drawing is not activated.)

Computer 12 then determines whether stylus 36 has been moved a sufficient distance to warrant adding a new point to the line being drawn. If the delta translation $\Delta_w$ exceeds predetermined threshold (such as 0.02 units), computer 12 determines that it needs to add another point. If not, the value of $\Delta_w$ is maintained and augmented when the next change in pen tip 42 location is computed in step 66 (70).

If the delta translation exceeds the threshold, it is transformed by "rotation only" from a description in $CS_{world}$ to a description in $CS_{object}$. ("Rotation only" means that the lower left $1 \times 3$ translation component of the transformation matrix is temporarily set to zero). The resulting delta translation is stored as the $1 \times 3$ vector $\Delta_o$ (72).

$$(X\Delta_w, Y\Delta_w, Z\Delta_w, 1)*(\text{rotation only}[\text{world\_to\_object}]) =$$
$$(X\Delta_o, Y\Delta_o, Z\Delta_o, 1)^T$$

The delta translation with respect to $CS_{object}$ is added to the vector $[d_{120}]$. The next point in the line is set to the new value of $[d_{120}]$ (74). Next, the delta translation $\Delta_w$ is set to zero (76). Computer 12 then cycles through its rendering routines. The new line with its newest endpoint appears on display 14 with one of a number of interpolations (e.g., straight lines, cubic splines, or hermite polynomials) connecting all of the points (78). When rendering is complete, computer 12 executes the block of steps collectively known as step 55 to update the information received from the sensors 20 and 22 (80).

If the stylus 36 is still activated, computer 12 repeats steps 66-80 to continue this drawing function (82). When the designer completes the line, he or she deactivates stylus 36 by releasing button 50. Once the designer begins a new line, the process commences again at step 58.

6. Detailed Description of Translation

The "translate" function, which is selected by the designer in the manner discussed above, allows the designer to move already drawn lines in 3D through simultaneous motion of the stylus 36 and pad 32. Translation is only performed in directions that are parallel to lines in the view plane of display 14. By constantly moving the pad 32, the designer can obtain multiple 3D views of lines associated with $CS_{object}$. Hence, the designer may perform complex 3D docking or mating tasks.

Figure 13:
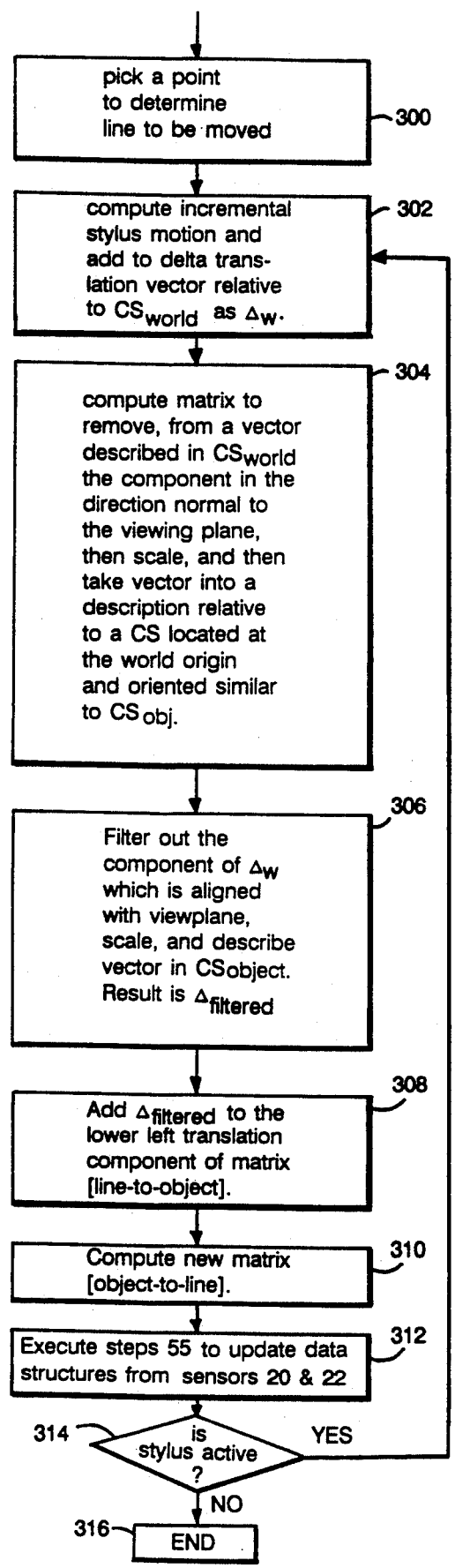
FIGS. 13 and 14 are flow charts of steps taken by the CAD system of FIG. 1 to translate a line.
Figure 14:
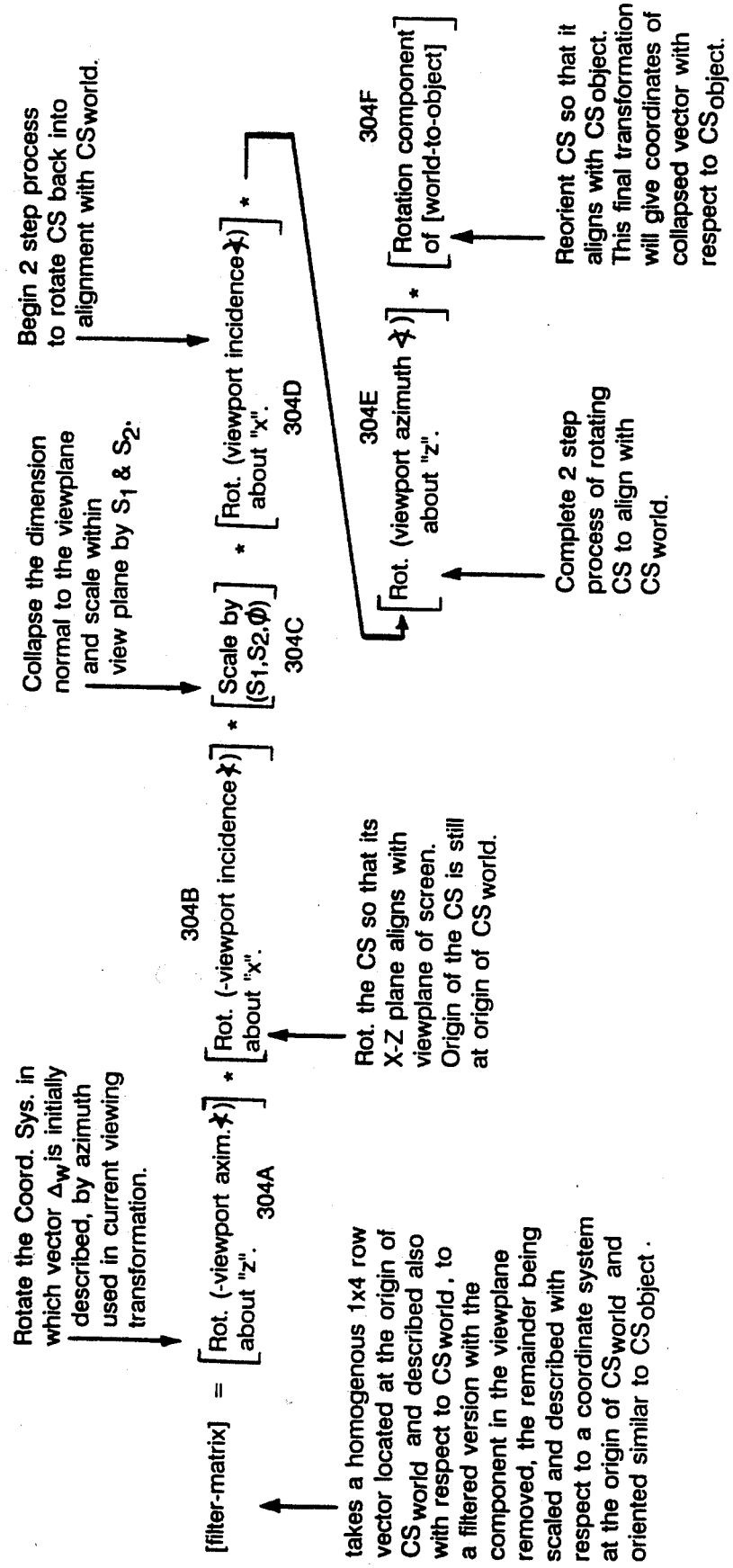
Figure 15:
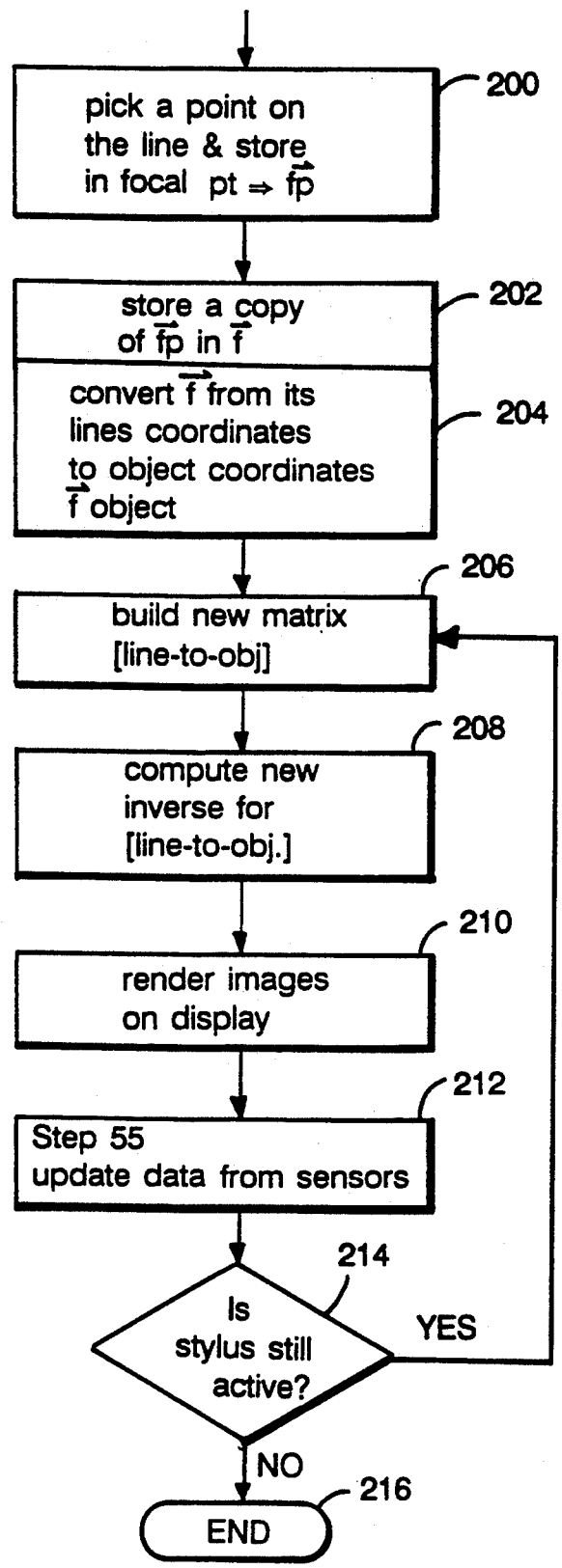
FIGS. 15-17 and 17A are flow charts and diagrams that describe and illustrate the steps taken to rotate a line about a point.
Figure 16:
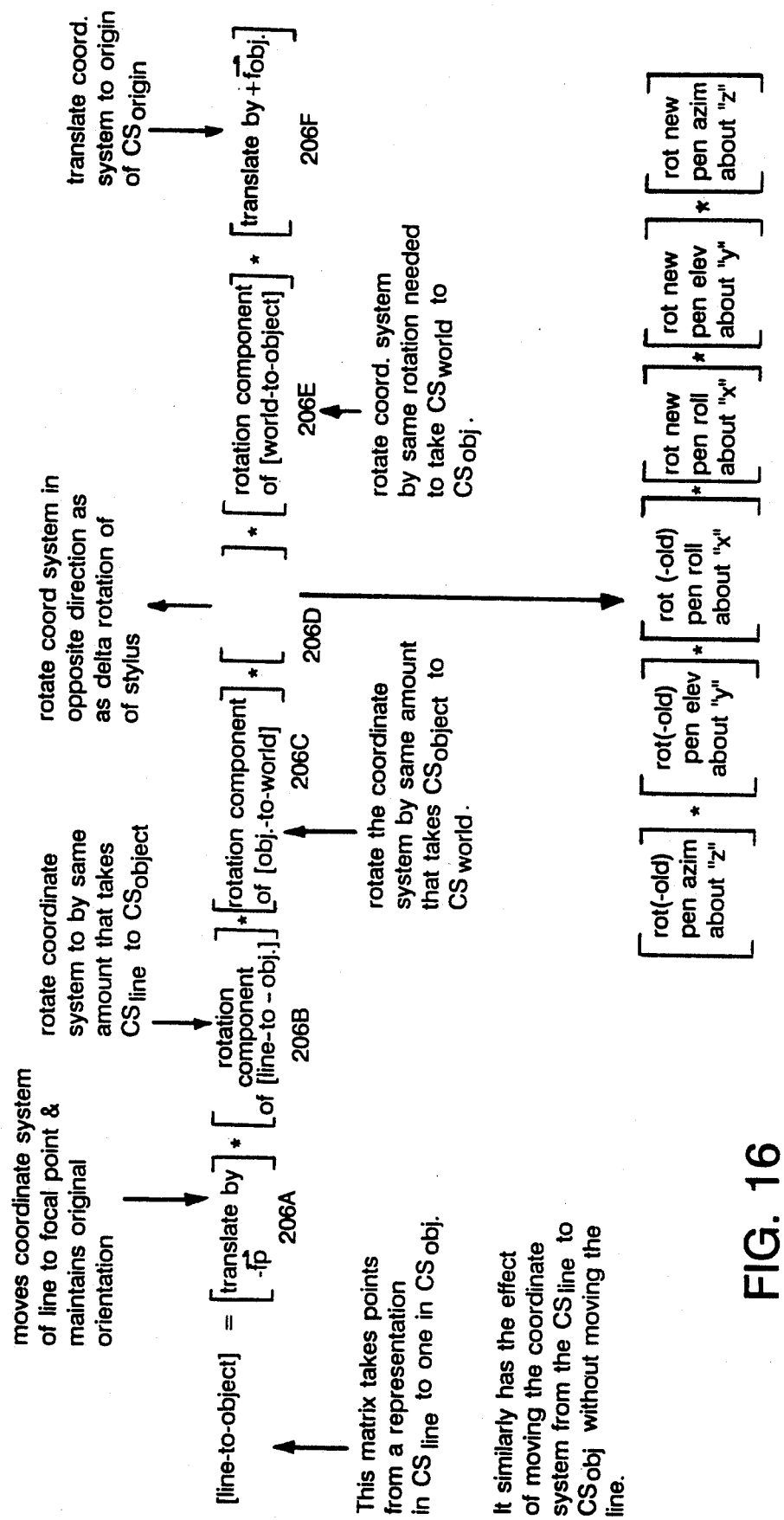

Referring to FIGS. 13 and 14, computer 12 begins a "translate" operation by responding to a signal from actuator 50 to select a point on a line (300). Next, computer 12 calculates the incremental stylus 36 motion during the time step from the last sampling of data from sensors 20 and 22. This incremental stylus 36 motion is added to a homogenous $1 \times 4$ row vector which stores delta translation $\Delta_w$. This vector is expressed with respect to $CS_{world}$ and is located at the origin of $CS_{world}$ (302). The next task for computer 12 is to compute the matrix for removing, from a vector, the component in the direction normal to the viewing plane, ($Z_{viewplane}=0$), scale the vector, and convert the sealed vector into a description relative to a coordinate system oriented similarly with $CS_{object}$ (304). This matrix is obtained by multiplying the following matrices together from left to right in FIG. 14: 1) multiply by Rot.-viewport azim. angle about "z"], rotates the coordinate system CS, in which vector $\Delta_w$ is initially described, by the azimuth angle currently used in the viewing transformation (304A); 2) multiply by [Rot.-viewport incidence angle about "x"], rotates the vector's coordinate system so that its x-z plane aligns with the view plane of the screen. The origin of the coordinate system is still at the origin of $CS_{world}$ (304B); 3) multiply by [Scale (S1, S2, 0)], collapses the dimension normal to the viewplane and scales within viewplane by S1, and S2 (304C); 4) multiply by [Rot.+viewport incidence angle about "x"], begins the two step process to rotate the coordinate system back into alignment with $CS_{world}$ (304D); 5) multiply by [Rot.+viewport azim.angle about z"], completes the two step process of rotating the coordinate system to align with $CS_{world}$ (304E); 6) multiply by (Rot. component only of [world\_to\_object]), reorients the coordinate system so that it aligns with $CS_{object}$. This final transformation will express the vector being transformed with respect to $CS_{object}$ (304F). The result of the steps collectively grouped under 304 is a matrix stored as [filter\_matrix].

Computer 12 uses [filter\_matrix] to filter out the component of vector $\Delta_w$ which is aligned with the viewplane, scale the vector, and describe it with respect to, and at the origin of, $CS_{object}$. The result is stored in the vector $\Delta_{filtered}$ (306). The following is the matrix operation:

$$\Delta_w*[\text{filter\_matrix}] = \Delta_{filtered}^{-1}$$

Next, computer 12 adds the (x,y,z) component of vector $\Delta_{filtered}$ to the lower left $1 \times 3$ row translation component of the matrix [line\_to\_object] which corresponds to the selected line (308). Computer 12 then takes the inverse of [line\_to\_object] for the selected line and stores the result in [object\_to\_line] for the selected line (310). Next, computer 12 updates the data structures with data sampled from sensors 20 and 22. This task is described in detail in the accompanying text for FIG. 12, step 55 (312). Finally, computer 12 determines if actuator 50 on stylus 36 is still activated (314). If so, then computer 12 repeats steps 302-314; otherwise, the "translate" function is stopped (316).

7. Detailed Description of Rotation

Referring to FIGS. 15-17 and 17A, the "rotate" rigid body feature discussed above changes the values of the matrices [line\_to\_object] and [object\_to\_line] for a selected line, so that the changing position and orientation of coordinate system $CS_{line}$, which is implied by the matrices mentioned above, causes the line to move in coordination with the motion of stylus 36. These matrices are changed once each time the computer 12 performs steps 55 (FIG. 12) to update the information received from the sensors 20 and 22, and only while rotation is active. The rotation about a point begins when the designer picks a point on a line using the stylus 36 to align the screen image of the pen 42 over the screen image of a point on a line. The point is picked when a button on the stylus is activated (200). Computer 12 stores the coordinates of the picked point as a homogenous $1 \times 4$ vector in $fp_{line}$ (202). Computer 12 then transforms the coordinates of vector $fp_{line}$ from its initial description in $S_{line}$ to one in $CS_{object}$, and stores the result (202), (204) in vector $f_{object}$:

$$[fp_{line}]*[line\_to\_object] = [f_{object}].$$

Next, computer 12 calculates the new value for matrix [line_to_object] so that the new position of the implied coordinate system $CS_{line}$ will cause the line to move relative to the object by an amount corresponding to the motion of the stylus 36 (206). The new matrix [line_to_object] is produced by multiplying the following matrices illustrated in FIG. 16 together from left to right: 1) multiply by ([translate by $-fp_{line}$]), translates the coordinate system from the desired new position of the line coordinate system $CS_{linenew}$ to the picked point coordinate system $CS_{line\_fp}$ (206A); 2) multiply by (rotation component of [line_to_object]), rotates $CS_{line\_fp}$ by same amount that rotates $CS_{line}$ to $CS_{object}$ to produce the result $CS_{fp\_object}$ (206B); 3) multiply by (rotation component of [object_to_world]), rotates $CS_{fp\_object}$ by the same amount that rotates $CS_{object}$ to $CS_{world}$ to produce the result $CS_{fp\_world}$ (206C); 4) multiply by:

[rot. −old pen azimuth about "z"]*[rot. −old pen elevation about "y"]*[rot. −old pen roll about "x"]*[rot. pen roll about "x"]*[rot. pen elevation about "y"]*[rot. pen azimuth about "z"]

rotates $CS_{fp\_world}$ in opposite direction to change in the rotation of the stylus 36 from the last to present data sampling. The result is $CS_{fp\_world2}$ (206D); 5) multiply by (rotation component of [world_to_object]), rotates $CS_{fp\_world2}$ by the same amount that rotates $CS_{world}$ to $CS_{object}$ to produce the result $CS_{fp\_object}$ (206E); 6) multiply by [translation by $f_{object}$], moves the coordinate system from $CS_{fp\_object}$ to $CS_{object}$ (206F).

Next, computer 12 calculates the new matrix [object_to_line] for the selected line as the inverse of the new matrix [line_to_object] for the selected line (208). Computer 12 then renders images on display 14. The designer immediately sees the incremental rigid body motion of the line relative to the object, due to the incremental motion of the stylus 36 (210). The computer 12 updates the data (212) from the sensors 20 and 22 by executing steps 55 (FIG. 12). Finally, computer 12 determines if the stylus 36 is still active (214). If the stylus 36 is active, then computer 12 repeats steps 206-214. Otherwise, execution of the "rotate" function ceases.

Figure 17:
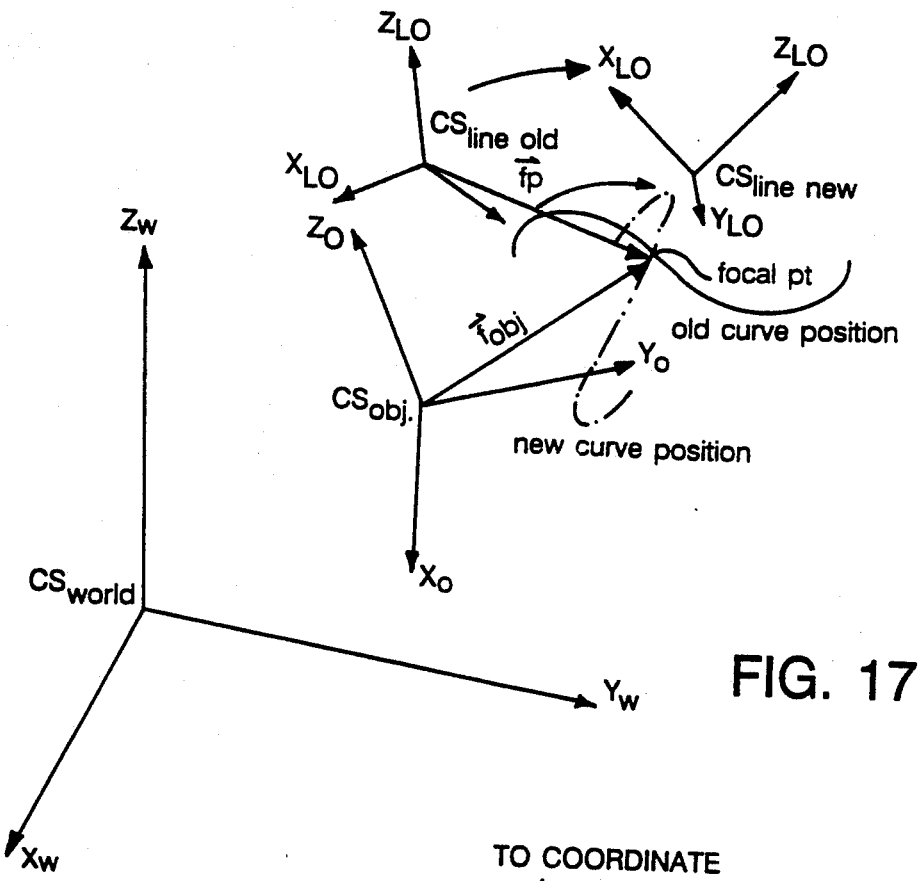
Figure 17A:
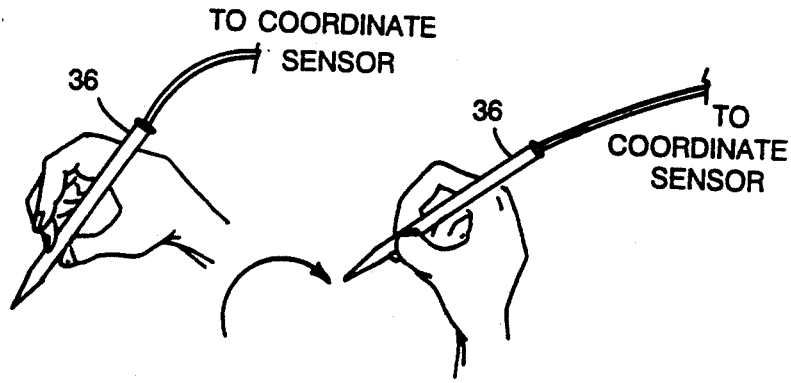

FIG. 17A shows the rotation of stylus 36 by the designer in a clockwise direction to cause the line shown in FIG. 17 to also rotate clockwise as a rigid body. That is, the entire line, rather than parts of the line, is rotated as a unitary structure.

8. Detailed Description of Axis Twist

Figure 18:
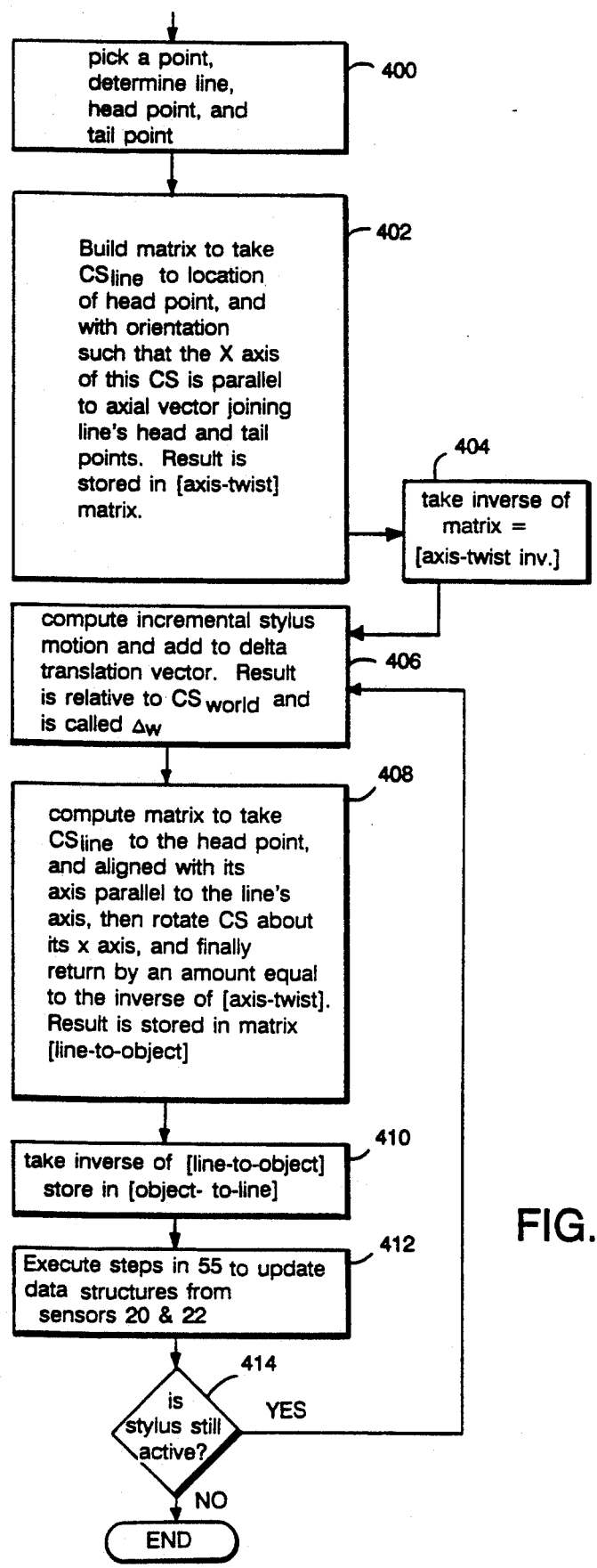
Figure 21:
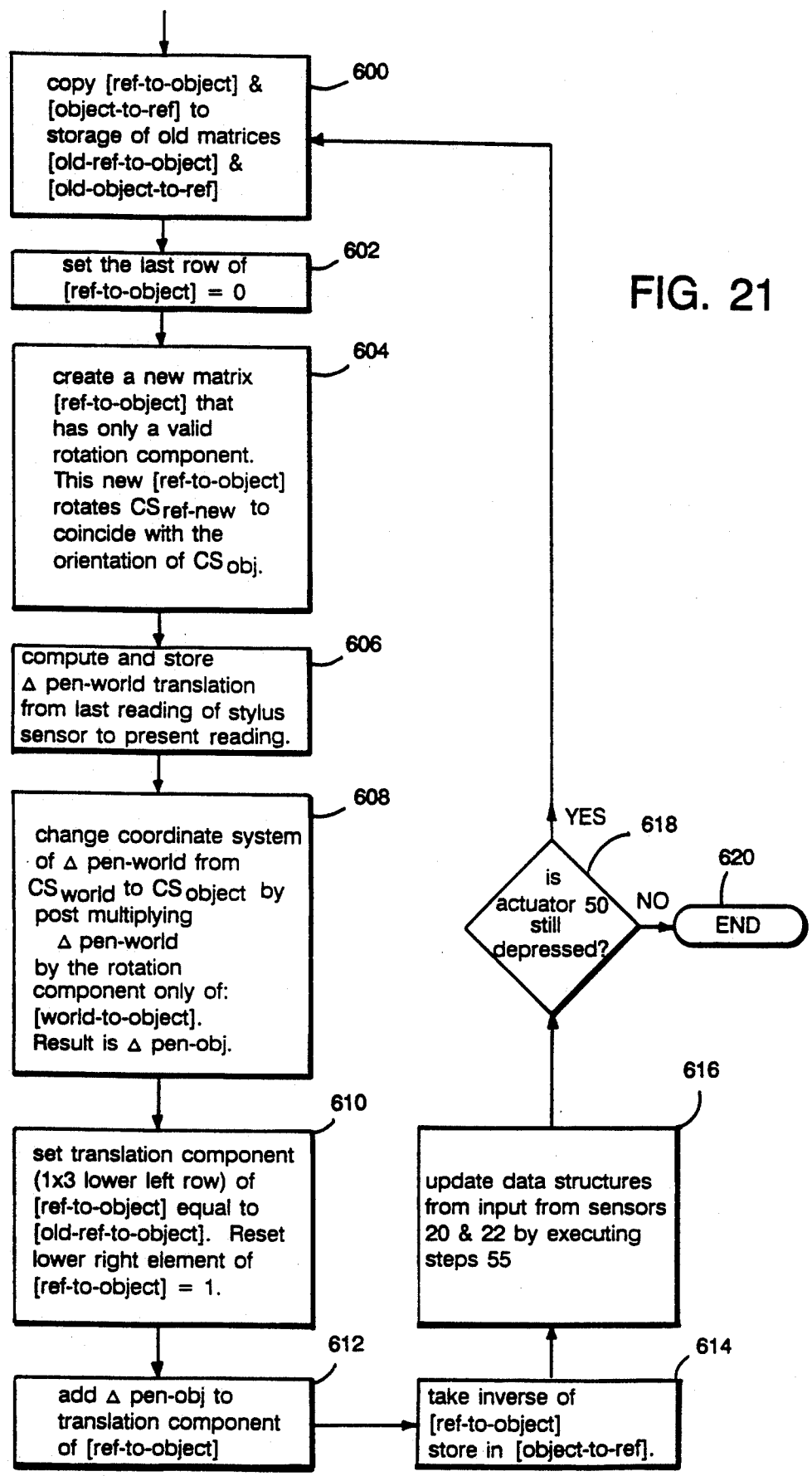
Figure 22:
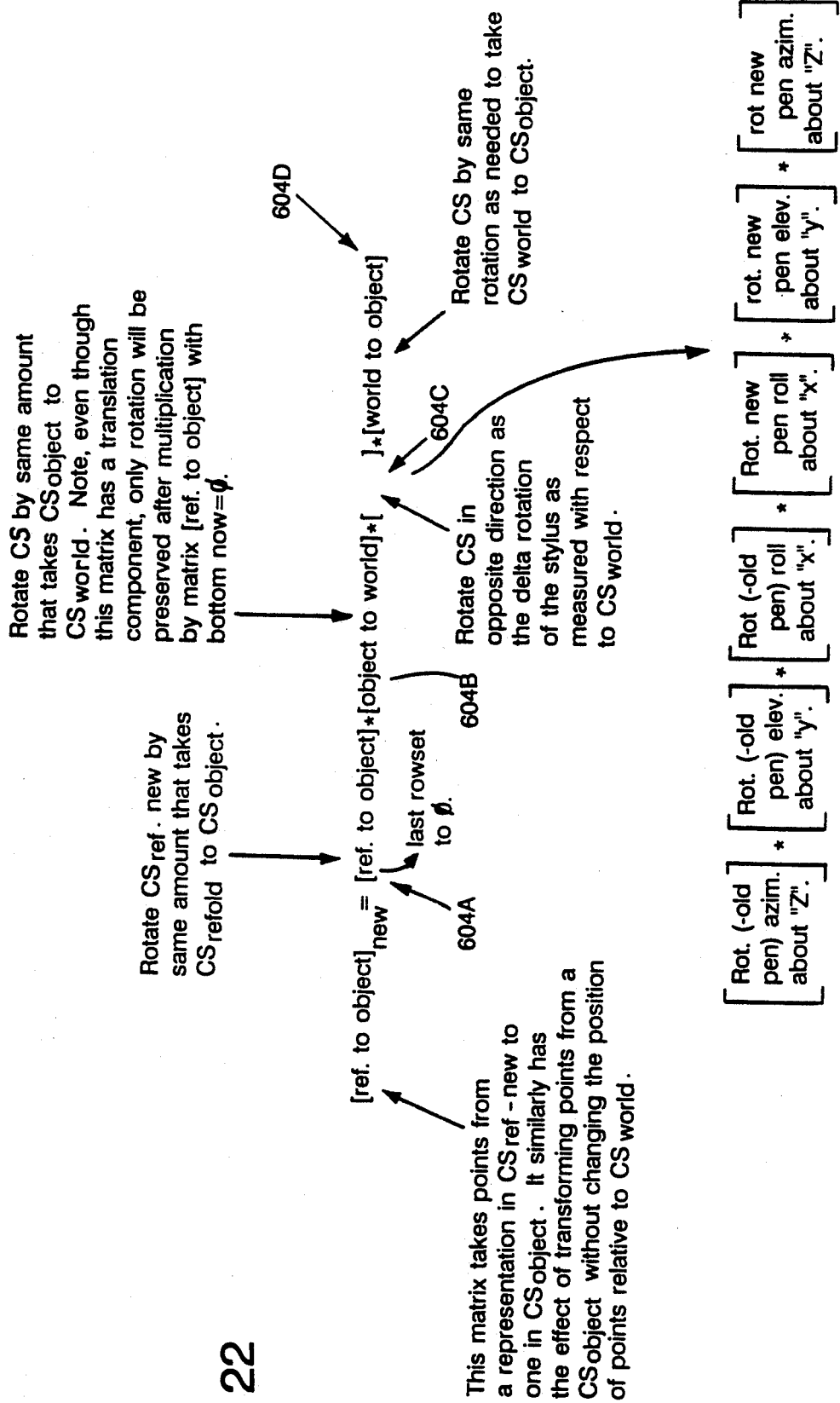
Figure 23:
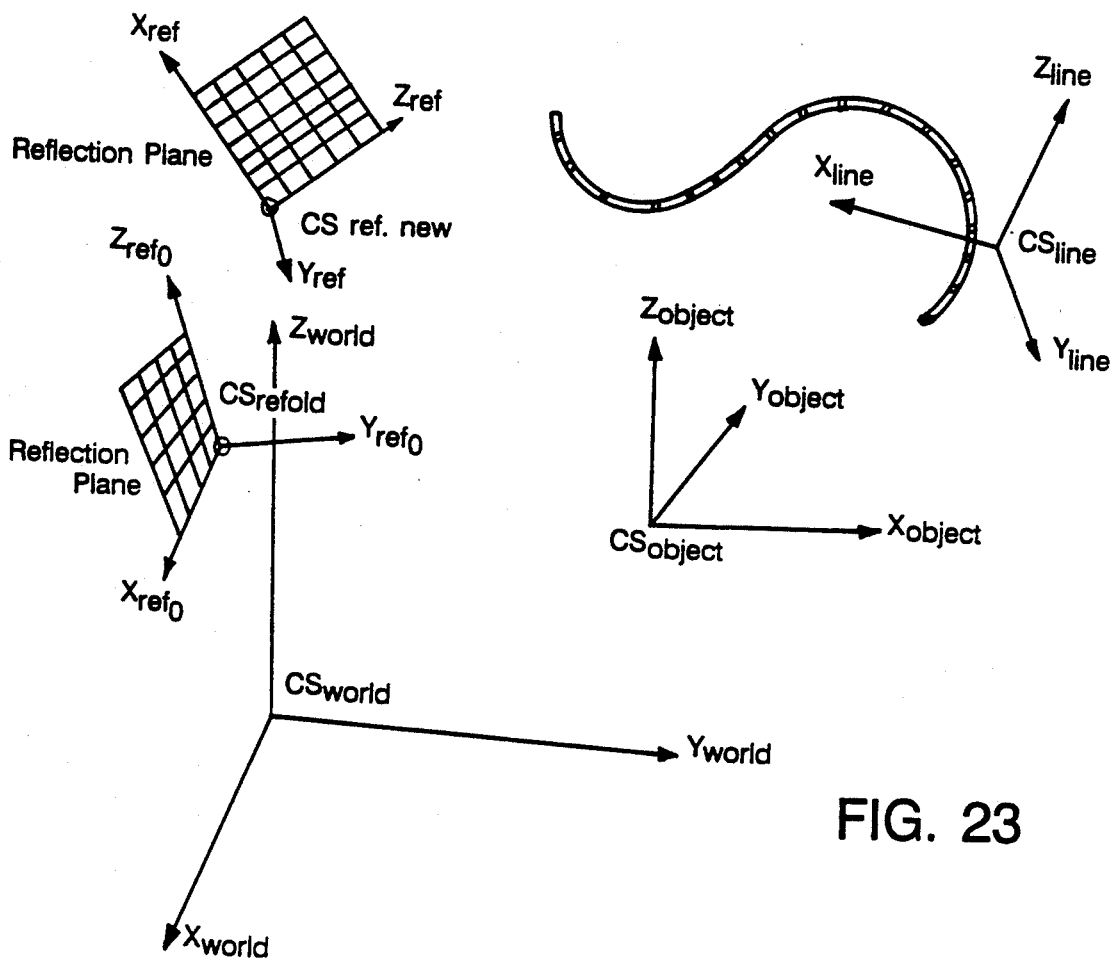

Referring to FIGS. 18-20, computer 12 performs rotation of a line about the axis joining its endpoints (i.e., the "axis twist" function discussed above) by repositioning and reorienting the coordinate system of the line $CS_{line}$. When the user enters "Axis Twist" mode and does a "pick" (described in detail above) on the line to be twisted, computer 12 copies the coordinates of the first and last points on the picked line into temporary point structures head and tail, respectively (400). Next, computer 12 constructs and stores a matrix defined as [axis_twist]. Matrix [axis_twist] moves the origin of $CS_{line}$ to the location of the of head. The [axis_twist] matrix also reorients $CS_{line}$ so that its x axis is parallel to the vector joining the points head to tail (402). Before creating matrix [axis_twist] computer 12 calculates the angles alpha and beta, and the vector line_vec, and its length line_len. This procedure is shown in steps (402A)-(402D).

The following matrices are then multiplied together from left to right to obtain the matrix [axis_twist]: 1) multiply by [trans. (−head)], which moves the origin of $CS_{line}$ to the position of head (402E); 1) multiply by [Rotation about "z" by −alpha] (402F); 3) multiply by [Rotation about "y" by beta] (402G), which together align $CS_{line}$ such that $CS_{line}$'s x axis is parallel to the vector line_vec (402A).

Next, computer 12 finds and stores matrix axis_twist_inv] by taking the inverse of matrix [axis_twist] (404). Computer 12 determines the incremental motion of stylus 36 and adds this vector to the delta translation vector $\Delta_w$, which is described with respect to $CS_{world}$ (406). In the next step, computer 12 finds and stores a new value for the line's matrix [line_to_object]. This matrix performs a coordinate transformation on lines which are described with respect to $CS_{line}$. The following matrices are multiplied together to left to right in FIG. 20 to obtain matrix [line_to_object]: 1) multiply by [axis_twist], causes $CS_{line}$ to be translated and rotated to the head point of the line, so that the x axis of $CS_{line}$ is aligned with the axis of the line (402H); 2) multiply by [Rot. by the change in the roll angle of stylus 36 about "x"], rotates $CS_{line}$ about its x axis corresponding to the change in the amount of twist about the stylus' longitudinal (x) axis (402I)-(402J); 3) multiply by [axis_twist_inv], rotates and translates $CS_{line}$ by opposite amounts specified by [axis_twist] in step 402H (402K).

Computer 12 then finds and stores the line's matrix [object_to_line] by taking the inverse of [line_to_object] (410). Next, computer 12 executes the steps in 55 (FIG. 12) to update data structures from sensors 20 and 22 (412). Finally, computer 12 determines if finger button 50 on stylus 36 is still pressed (414). If so, then computer 12 repeats steps 406-414. Otherwise, computer 12 terminates execution of "Axis_Twist".

9. Detailed Description of Reflection Planes

Figure 24:
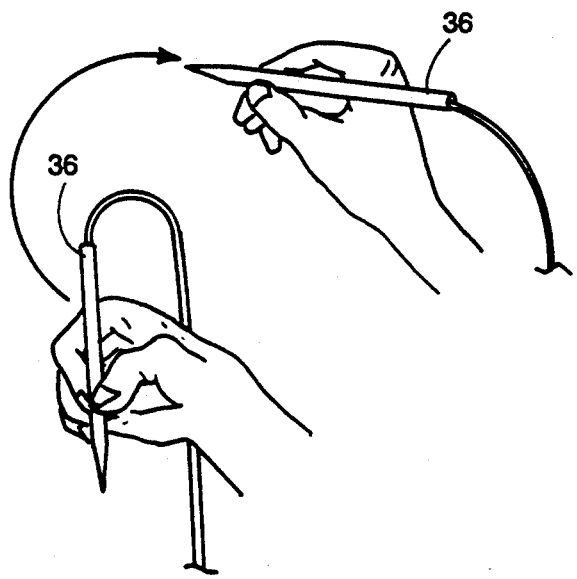

Referring to FIGS. 21-24 computer 12 begins a "move reflection plane" operation (which is invoked when the designer selects reflection item 106 from palette 94, FIG. 3) by responding to a signal from actuator 50 (e.g., a single depression of the button). This operation allows the designer to reposition and orient a reflection plane represented and displayed in virtual work area 15' by moving stylus 36 in a manner similar to the motion of the hand. FIG. 24 shows an example illustrating a hand motion which repositions $CS_{ref\ old}$ to $CS_{ref\ new}$. Computer 12 initiates the operation by copying the matrices [ref to object] and [object to ref] into storage matrices [old object to ref] and [old ref to object] (600). Next, computer 12 sets the four elements of the last row of [ref to object] equal to zero (602). Zeroing the last row of [ref to object] ensures that the matrix product of [ref to object]*[another matrix] will have no translation component. Next, computer 12 constructs a new matrix [ref to object] with only a valid rotation component (604). The new [ref to object] has the effect of rotating a coordinate system from an orientation similar to $CS_{ref}$ new to a coordinate system with orientation similar to $CS_{object}$.

$CS_{ref\ new}$ has an orientation which corresponds to the orientation of $CS_{ref\ old}$ plus the change in rotation of the stylus 36 about its tip from the last data sampling from sensing system 16. The new matrix [ref to object] is obtained by multiplying the following matrices together from left to right in FIG. 22: 1) multiply by [ref to object] with the last row set equal to zero, rotates $CS_{ref\ new}$ by the same amount that takes $CS_{ref\ old}$ to $CS_{object}$ (604A); 2) multiply by [object to world], rotates the coordinate system by same amount that takes $CS_{object}$ to $CS_{world}$ (604B; 3) multiply six rotation matrices that have the effect of rotating the coordinate system in the opposite direction of the rotation of stylus 36 about its tip, this rotation being the change in orientation from the last sampling of data from coordinate sensor 16 (604C); 4) multiply by [world to object], rotates the coordinate system by same amount needed to take $CS_{world}$ to $CS_{object}$ (604D). The result of steps collectively grouped under 604 is a new version of [ref to object], which still needs to have a translation component to be complete.

Computer 12 next calculates the change in position of pen icon 42 with respect to $CS_{source}$, and stores the result in the 1×3 row vector $\Delta_{pen\ world}$ (606). Computer 12 changes the coordinate system of $\Delta_{pen\ world}$ from $CS_{world}$ to $CS_{object}$ with:

$$[\Delta_{pen\ world}]*(\text{Rot. part of [world to object]}) = [\Delta_{pen\ object}]^T$$

(608). The lower left 1×3 row translation component of [ref to object] is then restored to its old value in [old_to_object], and incremented by the 1×3 row vector $\Delta_{pen\ object}^T$. Additionally, computer 12 resets the lower right element of [ref to object] to 1 (610)–(612). Next, computer 12 takes the inverse of [ref_to_object], and stores the result in [object_to_ref] (614). The data structures are updated (616) by computer 12 from the input from sensors 20 and 22 through the steps collectively known as 55 (See FIG. 12). Finally, computer 12 determines if actuator 50 is still depressed; if so, then computer 12 repeats steps 600–618; otherwise, computer 12 terminates the function "move reflection plane".

Referring to FIGS. 25 and 26, computer 12 begins a "reflect line" operation by executing a pick to determine which line will be reflected with respect to a reflection plane positioned and oriented at $CS_{ref}$ (700). Computer 12 copies the target line, including copying the matrices [line to object] and [object to line] into new line data [new line] (702). Computer 12 transforms this copy of the targeted line into the new reflected line. Next, computer 12 creates and stores a matrix [reflect line] which has the effect of moving the points on the copy of the target line [new line] to new positions, whereby the new positions form a mirror image of the targeted line (704). Points are first represented as 1×4 homogenous row vectors prior to being transformed. The matrix [ref line] is obtained by multiplying the following matrices together from left to right in FIG. 26: 1) multiply by [line to object], moves $CS_{line}$ of the copied line to be coincident with $CS_{object}$ (704A); multiply by [object to ref], moves $CS_{object}$ to be coincident with $CS_{ref}$ (704B); 3) multiply by [Scale (1, −1, 1)], reflects points 1×4 homogenous vector form through the x-z plane of $CS_{ref}$ (704C); 4) multiply by [ref to object], moves $CS_{ref}$ to be coincident with $CS_{object}$ (704D).

Next, computer 12 reflects the points on the copy of the target line by multiplying:

$$[\text{new line}]*[\text{reflect line}] = [\text{ref line}]^T.$$

The result [ref line] is the reflected line (706). The coordinate system for [ref line] is the same as $CS_{line}$ of the originally targeted line. Finally, computer 12 waits for the user to release actuator 50 to signal the termination of the function "reflect line" (708), (710).

10. Examples

Referring to FIGS. 27 and 28, the steps taken by the designer to rotate a model of an automobile fender from a view from beneath the fender (FIG. 27) to a front view of fender 500 (FIG. 28) are straightforward. Note that block 25 is not attached to pad 32 in this example. Block 25 is held at an angle so that the top of the block faces the display screen at an acute angle. The designer simply rotates his wrist so that the top of block 25 is oriented away from the screen, as shown in FIG. 28. Fender 500 is rotated in a corresponding manner.

Referring to FIGS. 29–36, the step-by-step creation of a three-dimensional object, a yacht, using system 10 and the features discussed above will now be described.

Figure 29:
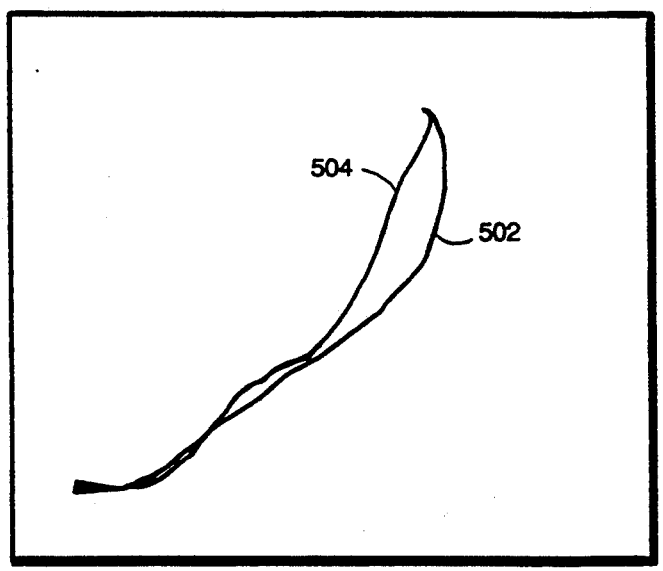

As shown in FIG. 29, first, the starboard deck line 502 is drawn as an unattached curve in space. Then, the designer selects the endpoints of line 502 as the endpoints for keel line 504. After line 504 is drawn in space, the computer "snaps" keel line 504 to these endpoints, and then the designer specifies the line's orientation by twisting stylus 36.

Figure 30:
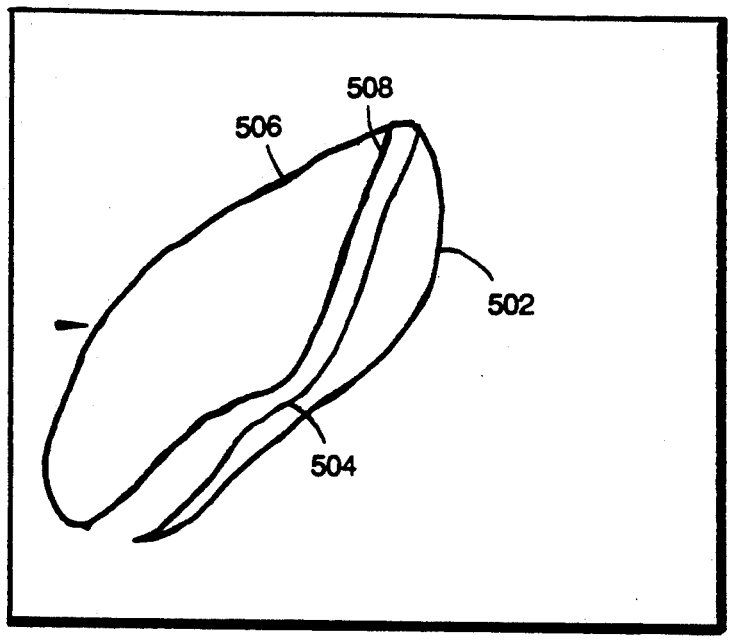

Referring to FIG. 30, a reflection plane down what will be the centerline of the yacht is created and is moved into the proper location using the stylus. The designer then creates mirror images 506, 508 of lines 502, 504, respectively, simply by "picking" those lines in the manner described above. This creates the port deck and keel lines 506, 508.

Figure 31:
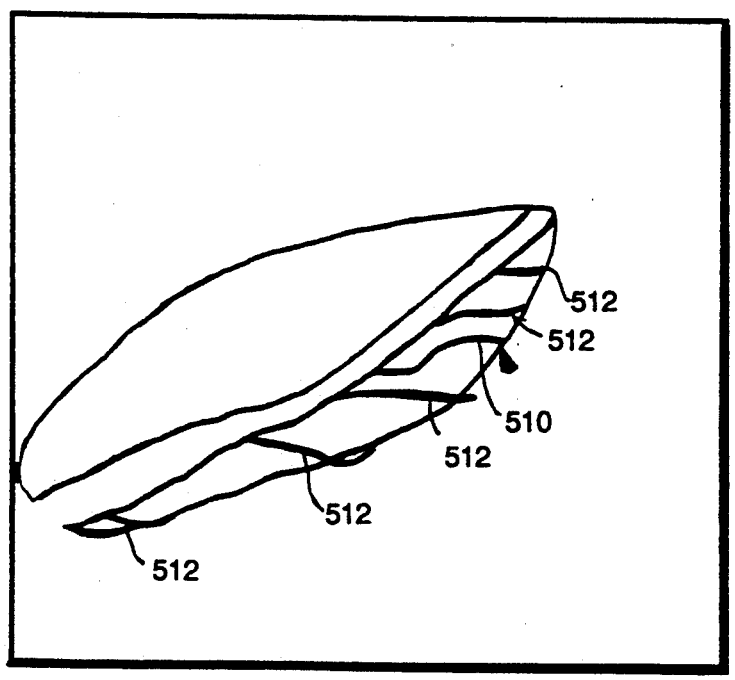

As shown in FIG. 31, the next step is to establish the shape of the hull by drawing the starboard bulkheads, using points on lines 502, 504 as preselected endpoints. After the shape of each bulkhead, e.g., 510, is captured, the designer twists his hand (to perform an "axis twist") until the desired orientation is obtained. The remaining bulkhead lines 512 are created in the same way.

Figure 32:
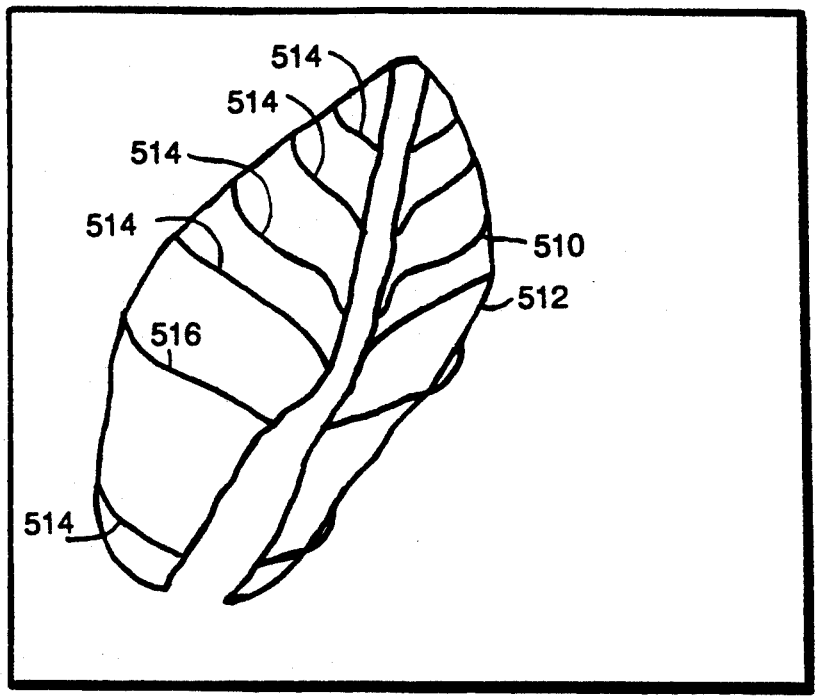

Referring to FIG. 32, the starboard bulkhead lines 510, 512 are then reflected to create port bulkhead lines 514 using the same reflection plane as was established earlier.

Figure 33:
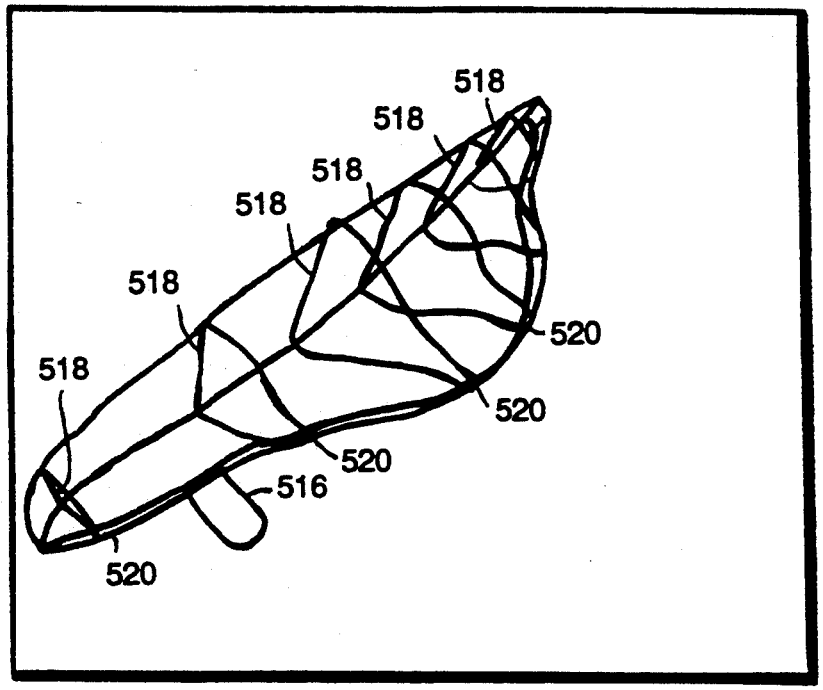

Next, as shown in FIG. 33, the rudder and keel and deck crosspieces are drawn. The rudder line 516 is created by picking two points on keel line 504 or 508 and drawing line 516 in space. When finished, computer 12 snaps line 516 into place. The deck crosspieces are drawn by selecting pairs of endpoints on deck lines 502, 506, drawing the individual lines 518, and snapping lines 518 into place. Keel crosspieces 520 are then added using points on keel lines 504, 508 as endpoints.

Figure 34:
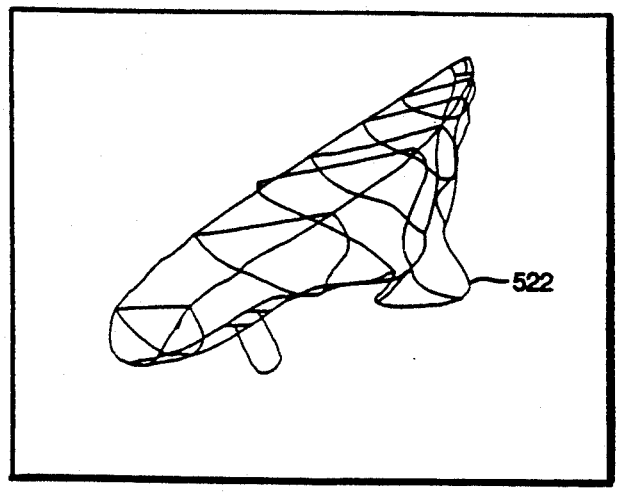

Then, the winged keel 522 shown in FIG. 34 is drawn. This is a fairly complex shape which is simplified by first drawing a planar sketch of the anticipated plan view of keel 22 on pad 32. The regular spacing of grid 34 aids in performing this task. Next, the designer traces the 3D contour of keel 522 in the space over the sketch, with the sketch serving as a guide during drawing. Then, these lines are fitted to endpoints on already existing lines that have been prespecified.

Figure 35:
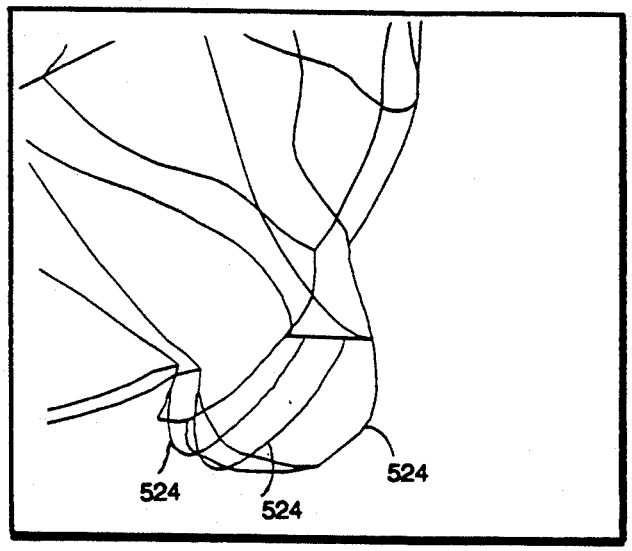

Referring to FIG. 35, the designer more precisely defines the shape of keel 522 by adding additional lines 524 between preselected endpoints of lines that have already been drawn.

Figure 36:
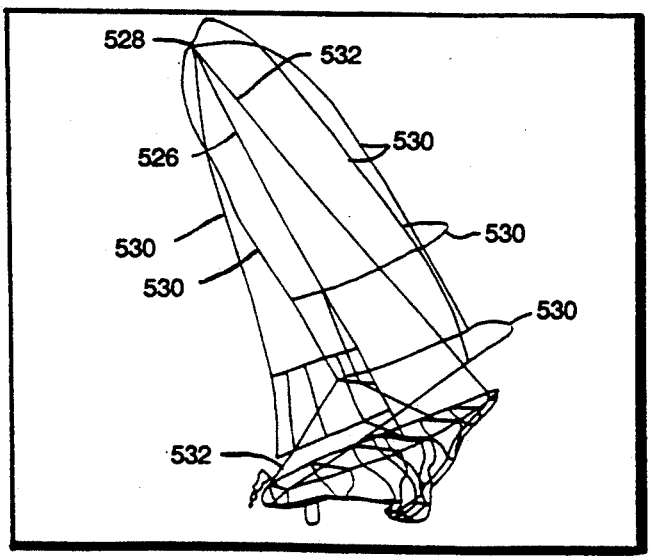

Referring to FIG. 36, the designer draws mast 526 by selecting a point on the deck and then drawing a straight line. This could be done by invoking the primitive straight line function. Once the designer has specified the shape of mast 526, he fixes its length by selecting its other endpoint 528. Next, lines 530 for the sail are drawn, followed by lines 532 for rigging.

11. Description of Physical Modeling of Curves

The traditional approach to the representation of curves in CAD systems is to construct mathematical models which are concerned solely with the geometry of the curve. The designer then interacts with this model by moving the "control points", which results in motions of parts of the curve in the area of the control points. The difficulty is that there is no natural tendency for such a representation to result in smooth or fair curves. Smoothness can only result from the laborious "tweaking" of control points. An alternative is to construct a mathematical model which imbues the curve with physical properties, for example, the properties of an elastic solid. For computational convenience, the curve can be considered to be a thin walled elongated elastic shell. The designer can now interact with the curve in much the same way he would interact with a real solid body, that is by applying forces and geometric constraints. The advantage of such a representation is that it results in naturally smooth surfaces, just as the deformation of a real elastic body tends to result in naturally smooth curves.

Physical modeling of curves can be implemented by solving the equations that govern the deformation and motion of the centerline of elongated bodies. These equations contain terms that model the bending, stretching and kinetic energies of the body. Thus, the modeled curve will have both resistance to bending and a resistance to stretch. The magnitude of these resistances can be separately controlled. The governing equations can then be solved by energy minimization methods.

The same principles can be applied to the modeling of surfaces, with the same resulting advantages over purely geometric modeling.

Although there is no succinct or mathematical measure of a curve's fairness, in general fair curves possess a few convex regions with evenly distributed low levels of curvature. We choose to design shapes with geometric primitives that naturally assume those two properties.

A shape which minimizes the curve's length and curvature is built. Mathematically, this can be approximated for curves which are described parametrically as the desire to minimize the following "energy" relation:

$$I(V(r)) = \frac{1}{2} \int_{curve} (\alpha |V_r|^2 + \beta |V_{rr}|^2 - 2\, Forces \cdot V) dr$$

where:

$V$ = position of the curve in space as
$V = [x(r), y(r), z(r)]$, with
$r$ = Parametric variable $$V_r = \frac{dV(r)}{dr} \text{ and}$$

$$V_{rr} = \frac{d^2V(r)}{dr^2}$$

Any section of the curve which possesses high curvature or great length will cause the value of the curve's energy to be increased. By allowing the curve to deform in response to its current shape to help reduce the curve's energy naturally, smoother curves can be generated without explicit input from the designer. To solve this problem numerically the problem is recast as a set of differential equations. Assume U is the shape of the curve which minimizes its energy. Any deviation from U will cause the energy of the system to increase:

$$I(U + eE) = I(U) + e \int_{curve} (\alpha U_r \cdot E_r + \beta U_{rr} \cdot E_{rr} - 2\, Forces \cdot E) dr + \frac{1}{2} e^2 \int_{curve} (\alpha |E_r|^2 + \beta |E_{rr}|^2) dr$$

where:

U = minimum energy state being sought
E = any admissible variation from that shape
e = a weight This yields the following differential equation as a requirement to minimize energy:

$$-\alpha U_{rr} + \beta U_{rrrr} = Forces$$

Numerically, an exact solution to U is not found. Instead U is approximated by the space of shapes that can be expressed as a set of piecewise Hermite cubic polynomials. The approximated shape between two nodes i and j can be expressed as:

$$U[r_i, r_j] = F_0(r)X_0 + F_1(r)X_1 + F_2(r)X_2 + F_3(r)X_3$$

where:
$U[r_i, r_j]$ = approximates the solution, U, between nodes $i$ and $j$
$F = [F_0 F_1 F_2 F_3]$ = interpolating functions $$F_0 = \frac{(6s^2 - 6s)}{h}$$

$$F_1 = (3s^2 - 4s + 1)$$

$$F_2 = \frac{-(6s^2 + 6s)}{h}$$

$F_3 = (3s^2 - 2s)$ with
s = ranging from 0 to 1 and
h = parametric distance from $node_i$ to $node_j$
$X^t = [X_0 X_1 X_2 X_3]$ = Nodal Values
$X_0$ = Position of $node_i$
$X_1$ = Slope of $node_i$
$X_2$ = Position of $node_j$
$X_3$ = Slope of $node_j$ Using Galerkin's method, the differential equation can be approximated as a set of linear algebraic equations:

$$Kx = F$$

where:
K = a stiffness matrix
x = column vector of all node positions and slopes
F = a distributed Force column matrix The A and F matrices are the summation of each element's stiffness and distributed force matrices. The A matrix is symmetric and nicely banded. The F column matrix can be modified directly by the designers to produce arbitrary shapes. Each element and stiffness matrix and distributed force matrix are calculated as:

$$K_i = K_{i1} + K_{i2}$$

With $$K_{i1} = \text{"stiffness matrix"}: \int_{r_i}^{h} (U_r^2) dr = X^T K_{i1} X$$

$$K_{i2} = \text{"bending matrix"}: \int_{r_i}^{h} (U_{rr}^2) dr = X^T K_{i2} X$$

and $$\text{Force}_i = \int_{r_i}^{h} (\text{Forces } F_i) dr$$

Time is introduced to make the system interactive. As the force vector is modified the curve responds by changing shape. By integrating through time the designer can visualize how inputs are causing shape changes. The system dynamics are described as:

$$M \frac{d^2 x}{dt^2} + C \frac{dx}{dt} + Kx = F$$

where:
M = a mass matrix
C = a damping matrix

The mass and damping matrices are scalar multiples of the identity matrix. The magnitude of the mass and damping scalars a well as the size step, dt, determine the speeds at which a curve moves on the screen and the rate at which equilibrium is approached. Numerical time integration is accomplished by approximating time discretely and using a finite difference approximation to the time derivatives. This yields a final set of linear algebraic equations to be solved:

$$A x_{t+dt} = G$$

where:

$$A = K + \frac{1}{2dt} C + \frac{1}{dt^2} M$$

$$G = F + \left( \frac{1}{2dt} C - \frac{2}{dt^2} M x_{t-dt} \right) x_{t-dt} + \frac{1}{dt^2} M x_{t-dt}$$

The designer can constrain the shape of the curve by prescribing a node's location and or its slope. These constraints are enforced by treating a constrained node's of as known and moving all the terms in the A matrix dependent on that value into the G vector. Each constraint results in reducing the size of the A matrix and adding up to six terms to the G column vector.

Thus, by controlling the domain in space and the solution through time, the designer is provided with two strategies for driving the fairness of curves. The designer can identify a small length of the curve and asked for it to be deformed through time. As the solver is stepped through time by the user, the curve deforms to increase its fairness. The designer can choose when to stop the integration to get a curve that retains its original character after having been made fairer. Curves allowed to integrate to equilibrium will tend to straight or simply curved regions. Regions not selected by the designer will remain unchanged.

The system of equations is assembled in software in computer 12 by the function, init dcurve(). This function builds an A matrix that reflects the nodal distribution of the curve and the number of designer applied constraints. Special load structures are built that will be used to generate the terms needed for the enforcing of the designer defined constraints. The function init dcurve() then calls the function band factor() which executes the forward step of a Gaussian elimination. This leaves the stored A matrix in a convenient form for rapid solution on the back substitution step of the Gaussian elimination. This initialization of the A matrix must be called whenever the user changes the topology of the curve by adding or removing nodes.

The system of equations is solved by the function, solve dcurve(). One call to dcurve will integrate the equations one time step. Solve dcurve() uses the current shape position to calculate the G vector to embody the effects of dynamic load, designer given constraints, and designer given forces. It then calls the function, band solve pt(), to actually execute the time step integration. The function, band solve pt(), executes a forward elimination step on the G vector followed by the final backward substitution to find the shape of the curve at the end of the current time step. Both band factor() and band solve pt() functions have been written to take advantage of the banded symmetric nature of the A matrix.

A curve is represented as a set of nodes. Each node has six degrees of freedom that determine the node's position and the curves slope through the node. Each node has a stored r value that remembers the location of the node in parametric space. In the program curves are called dcurve short for either dynamic or deformable curves. The functions supporting the curve's data management and their effects are:

| | |
|---|---|
| create dcurve( ): | allocates space and initializes values for a dynamic curve with no points. |
| delete dcurve( ): | frees all space associated with a dcurve. |
| set dcurve hh( ): | scales the parametric distance between nodes so that $0 < r < 1$ |
| set elem state( ): | returns an integer value determining the constraint state of each node. |
| add dcurve pt( ): | Adds a node to the dcurve structure. |
| refine dcurve pt( ): | inserts a node in the curve structure |

A curve also has a defined alpha and beta value which weights the curve's desires to be short and straight. Each curve also has a stored mass, damping and time integration size step.

An A matrix can be built and saved with each curve based on the information in the curve's node definitions. The A matrix is stored as a set of upper diagonal vectors taking advantage of the symmetry and bandedness of the A matrix. The functions supporting the management of the A matrix are:

| define A matrix( ): | Allocates room for the A matrix |
| delete A matrix( ) | frees A matrix allocated space |
| build A matrix( ): | builds the A matrix accounting for user supplied constraints |
| build K matrix( ): | builds a K matrix for a single element |
| add dyn A matrix( ): | Adds terms to the A matrix due to the dynamics of the system |
| add elem A matrix( ): | adds an elemental K matrix to the global A matrix |

Actions on the A matrix are built into the b vector. The b vector is an amalgamation of the all the effects of the user and system supplied loads. Each dcurve has one b vector. The functions supporting the management of the b vector are:

| build b( ): | assembles the b vector from all sources and stores it ready for the solver |
| calc c from pos( ): | adds to the b vector forces which enforce the user supplied constraints |
| store b result( ): | distributes the information from a solve cycle back into the dcurve data structure |

The designer supplied forces are remembered as a set of LOAD structures. Each load structure stores enough information to calculate its effect on any node in the dcurve. Loads can be made to act on any subset of the nodes of the dcurve. These loads are then linearly interpolated across an element and distributed to the nodal forces. The functions supporting load management in the dcurve are:

| add dcurve load( ): | add a load structure to the dcurve |
| rm dcurve load( ): | remove a load from the dcurve structure |
| is in dcurve load( ): | is a particular load in the dcurve data |

In addition loads are supported by the functions:

| create load( ): | allocate space for a load structure |
| delete load( ): | remove the space for a load structure |
| is in pt load( ): | is a node in affected by this load |
| add pt load( ): | add node to this load |
| refine pt load( ): | update nodal data to comply with a refined dcurve |
| rm pt load( ): | remove node from this load list |
| draw load( ): | output a graphic icon for the load |
| add loads( ): | add the effects of the loads together into the G vector prior to solving |
| distribute force b( ): | change a distributed force along an element into a set of nodal forces |
| distribute force rdofs( ): | change a distributed force along an element into a set of nodal forces |

OTHER EMBODIMENTS

Other embodiments are within the scope of the claims.

For example, the pen-shaped stylus may be replaced by a tool of another shape, such as a brush. Also, sensor 20 need not be attached to a pad, but may instead be held in the palm of one of the designer's hands to give the sensation of holding the actual object being drawn. The pad may also include an erasable writing surface.

Further, the invention is not limited to the use of two sensors; a single sensor or more than two sensors may be used. Additionally, one or more of the sensors may actually by attached to one or more fingers on the designer' hand.

Groups of lines may be virtually linked to allow the designer to modify all of the lines in the group at once, rather than one at a time. Also, groups of lines can be spliced together to form a single line.

CAD system 10 may also retain in memory a library of designs, an "archetypical image bank", which may be accessed by the designer (such as through the "File" selection of menu bar 92, FIG. 3) to provide a "starting point" when commencing a new design. The image bank would contain files of basic, "boilerplate" designs for different classes of objects (e.g., automobiles, boats, etc.).

The invention may be extended to create surfaces defined by the lines drawn using stylus 36 and modify these surfaces. A group of bounding lines are selected and virtually linked so that they will be treated together. Then, a set of interpolated points are established in 3D space among the bounding lines. Modification features analogous to those described above (e.g., displacement, tweezer) may then be invoked to control the interpolation points (individually or as a group) to define and modify the fitted surface. Boundary conditions may be prespecified to establish continuity between adjoining sets of these fitted surfaces.

Likewise, energy minimization algorithms (analogous to those used in the dynamic curve modification mode described above) may be applied by the designer to groups of bounding lines to smooth both the lines and the fitted surfaces, as well as defining the interpolation used to plot the interpolation points.

After the fitted surfaces have been created, a modification feature similar to the "force gun" mode 114 described above may be employed by the designer to dynamically reshape the surfaces. As an alternative, the stylus can be used as a "force vacuum" to pull lines and/or surfaces outward. Also, the designer may configure stylus 36 to radiate simulated pressure waves from its tip (and hence the tip of icon 42). These pressure forces will displace groups of points, lines, and surfaces which they encounter or which have been prespecified.

System 10 can be used to design parts which are intended for direct interface with already existing physical parts and to modify already existing parts. In this mode, the stylus is used to trace and digitize an existing physical model of a part which is, e.g., placed on pad 32. Digitizing can be accomplished by drawing freeform lines while moving the stylus over the surface of the physical part. Once the physical part has been digitized, the computer representation of the part can be used as the basis for further modifications of the part. In addition, the computer representation of the part can be used as the basis for the design of mating or nearby parts. As an example, the designer could digitize the motor assembly and other interior elements of a power tool and then use system 10 to design the housing to mate with the interior parts.

The appended source code appendix (incorporated herein by reference) embodies the routines executed by computer 12 to perform the functions discussed above.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

We claim:

1. A computer system for aiding a designer in the design of an object and for generating an image of said object on a display, comprising means for defining a three-dimensional designer's work area, a first sensor representing the object and configured to be held by the designer in one of the hands and moved in three dimensions in said designer's work area by the designer, said first sensor and said means for defining acting in combination to provide first signals that indicate the position of said first sensor in the designer's work area, a second sensor configured to be held by the designer in the other one of the hands and moved by the designer in three dimensions in the designer's work area, said second sensor and said means for defining acting in combination to provide second signals that indicate the positions of said second sensor in the designer's work area, and means, responsive to said first signals and said second signals, for: (1) generating an image on said display that corresponds to a three-dimensional model of the object in a virtual work area that corresponds to the designer's work area, said model having a shape defined by movement by the designer of said second sensor in said designer's work area, and (2) controlling a position of said displayed image of the model in said virtual work area in accordance with the motion of said first sensor in said designer's work area.

2. The system of claim 1 wherein said means for generating and controlling is further responsive to said signals from said first sensor to cause said model to have a position and orientation in the virtual work area that corresponds to the position and orientation of the first sensor in the designer's work area, whereby as the designer moves said first sensor in three dimensions said means for generating and controlling alters said displayed image to simulate corresponding three-dimensional movement of said displayed model in the virtual work area.

3. The system of claim 2 further comprising means for producing a representation of said first sensor on said display, said means for producing being responsive to said signals from said first sensor to cause said representation to assume a position and orientation in said virtual work area that corresponds to the position and orientation of said first sensor in said designer's work area, whereby as the designer moves said first sensor in three dimensions said means for producing causes said representation of said first sensor to be moved on said display to simulate corresponding three dimensional movement of said representation in said virtual work area, thereby to provide to the designer a sensation of holding said representation.

4. The system of claim 3 wherein said first sensor is mounted on a working surface, and said representation represents said working surface.

5. The system of claim 4 wherein said working surface comprises a planar pad.

6. The system of claim 4 wherein said working surface comprises an article adapted to be held in the palm of the hand.

7. The system of claim 3 further comprising means for producing a representation of said second sensor on said display, said means for producing being responsive to said signals from said second sensor to cause said representation of said second sensor to assume a position and orientation in said virtual work area that corresponds to the position and orientation of said second sensor in the designer's work area, whereby as the designer moves said second sensor in three dimensions said means for producing causes said representation of said second sensor to be moved on said display to simulate corresponding three dimensional movement of said representation of said second sensor in said virtual work area, thereby to provide to the designer a sensation of holding said representation of said second sensor.

8. The system of claim 7 wherein said second sensor represents a configurable tool and is adapted to be hand held by the designer.

9. The system of claim 8 wherein said second sensor is disposed in a stylus, and said representation represents said stylus.

10. The system of claim 7 wherein when said the designer holds said first and second sensors in two hands, the displayed positions, orientations, and movement of said model, said representation of said first sensor, and said representation of said second sensor correspond to the relative positions, orientations, and movements of the hands to provide kinesthetic feedback to the designer.

11. The system of claim 1 wherein said second sensor comprises means for allowing the designer to selectively enable said second sensor to cause said means for generating and controlling to create said lines in response to said signals from said second sensor when said second sensor is moved.

12. The system of claim 11 wherein said second sensor is disposed is a stylus and said means for enabling and disabling responds to actuation of a button on said stylus by the designer.

13. The system of claim 12 wherein said means for generating said controlling is further responsive to said signals from said first sensor and said second sensor to cause the position and orientation of said model to change on said display in response to movement of said first sensor without causing a line to be drawn on said display in response to movement of said second sensor, unless said second sensor is enabled and said stylus is moved.

14. The system of claim 1 wherein said means for generating and controlling comprises means for executing sequences of operations to aid in said design of said object.

15. The system of claim 14 further comprising means for generating control signals to enable a designer to selectively control a succession of the execution of said sequences by said means for generating and controlling.

16. The system of claim 15 wherein said second sensor is disposed in a stylus and said means for generating said control signals is responsive to actuation of a button disposed on said stylus by said designer, and further comprising means for generating one or more tokens on said display that provide the designer with choices as to which sequence is to be executed, said token generating means being responsive to said signals from said second sensor and said control signals to enable one of said choices to be selected in response to: the movement of said stylus so that a displayed representation thereof coincides with a position of the token that corresponds with said choice; and the actuation of said button to send one of said control signals, and means for causing said generating and controlling means to be responsive only to two dimensional movement of said stylus when said representation of said stylus is moved among said tokens.

17. The system of claim 1 wherein said first and second sensors are six degree of freedom sensors that permit the designer to specify seven degrees of freedom to determine said position, orientation and scale of said line in the virtual work area.

18. The system of claim 17 wherein said seven degrees of freedom include the spatial coordinates for each endpoint of the line and an angular orientation of the line with respect to an axis containing said endpoints.

19. The system of claim 18 further comprising means for allowing the designer, before creating the line, to prespecify any one or more of said degrees of freedom.

20. The system of claim 18 further comprising means for allowing the designer to prespecify the spatial coordinates of both endpoints of said line.

21. The system of claim 18 further comprising means for allowing the designer to prespecify the spatial coordinates of one endpoint.

22. The system of claim 1 further comprising scaling means for allowing the designer to prespecify a scale of at least one of said lines before drawing said line.

23. The system of claim 22 wherein said scaling means responds to signals from one of said sensors that identify the spatial coordinates in the virtual work area of both endpoints of the line.

24. The system of claim 1 further comprising means for allowing the designer to indicate a selection of a line in the three dimensional model to the computer system by causing the representation of the stylus to be positioned over a point on the line in a two-dimensional plane of the display, and then indicating selection of said line by depressing said button.

25. The system of claim 1 further comprising means for causing the image of the model to be displayed in perspective so as to convey to the designer a three dimensional nature of said model.

26. The system of claim 1 further comprising means for causing the image of the model to be displayed in stereo so as to convey to the designer a three dimensional nature of said model.

27. The system of claim 1 further comprising means for causing the image of the model to be displayed with shading so as to convey to the designer a three dimensional nature of said model.

28. The system of claim 1 further comprising means for causing the image of the lines of the model to be displayed with intensity which varies with distance normal to a plane of said display so as to convey to the designer a three dimensional nature of said model.

29. The system of claim 1 further comprising means for causing the image of the lines of the model to be displayed as tubes centered on the lines so as to convey to the designer a three dimensional nature of said model.

30. The system of claim 1 further comprising means for causing the image of the lines of the model to be displayed with polygons regularly spaced along the lengths of the lines, centered on the lines, so as to convey to the designer a three dimensional nature of said model.

31. The system of claim 1 further comprising means for causing the image of the lines of the model and a displayed representation of said second sensor to be displayed with shadows projected on a floor depicted on the display so as to convey to the designer a three dimensional nature of said model.

32. The system of claim 1 wherein said means for defining comprises an emitter for transmitting a reference signal in said three-dimensional designer's work area, each one of said sensors including means for intercepting said reference signal and providing said signals that indicate the position and orientation thereof based on said reference signal.

33. A computer-aided method for aiding in the design of an object and generating an image of said object on a display, comprising defining a three-dimensional designer's work area with a device, representing the object with a first sensor configured to be held in one of the hands, providing a second sensor configured to be held in the other one of the hands, moving said first sensor in three dimensions in the designer's work area with said one hand to cause said first sensor and said device to act in combination to provide first signals that indicate the position of said first sensor in the designer's work area, moving said second sensor in three dimensions in the designer's work area with said other hand to cause said second sensor and said device to act in combination to provide second signals that indicate the position and orientation of said second sensor in the designer's work area, causing said computer system to respond to said first signals and said second signals by:

generating an image on the display that corresponds to a three-dimensional model of the object in a virtual work area that corresponds to the designer's work area, said model having a shape defined by movement of said second sensor in said designer's work area; and controlling a position of said displayed image of the model in said virtual work area in accordance with the motion of said first sensor in said designer's work area.

34. The method of claim 33 further comprising using said sensors to:

create said lines to produce a rough outline of said object, edit said lines to modify said lines to form a skeletal outline of said object, fit surfaces to groups of said lines about said skeletal outline, and modify said surfaces to produce a final shape of said object.

35. The method of claim 34 further comprising causing said computer system to create a primitive shape,
selecting a specified location in said virtual work area at which said shape will be displayed by positioning said second sensor at a corresponding location in the designer's work area, and
causing said shape to be displayed at said specified location by signaling said computer system.

36. The method of claim 32 further comprising creating at least one of said lines by specifying with said sensors, in any order,
the shape of said line,
the position and orientation of said line in the virtual work area, and
the scale of said line.

37. The method of claim 33 wherein said second sensor comprises a stylus that includes a button-actuated mechanism for sending control signals to said computer system, and further comprising controlling said design by manipulating said stylus and selectively actuating said button.

38. The method of claim 37 further comprising twisting said line about an axis containing endpoints of said line by:
actuating said button to send one of said control signals to said computer, and
rotating said stylus about a longitudinal axis while actuating said button.

39. The method of claim 37 further comprising copying an existing line at a selected position and orientation in the virtual work area by:
identifying the line using said stylus,
locating said stylus at a position and orientation in the designer's work area that corresponds to said selected position and orientation in the virtual work area, and
signaling the computer system by actuating said button to cause said computer system to create said line at said selected position.

40. The method of claim 37 further comprising creating a mirror image of a selected line by:
identifying the line using said stylus,
designating a reflection plane for said mirror image using said stylus, and
signaling the computer system by actuating said button to cause said computer system to create said mirror image.

41. The method of claim 40 further comprising changing the position and orientation of said reflection plane by:
correspondingly changing the position and orientation of said stylus, and
signaling the computer system by actuating said button when the reflection plane is in the desired position and orientation.

42. The method of claim 37 further comprising causing a line to be rotated as a rigid body in the virtual work area by rotating the stylus about its tip.

43. The method of claim 42 comprising rotating said line by an amount and in a direction that corresponds to the amount and direction of rotation of said stylus.

44. The method of claim 37 further comprising causing a line to be rotated as a rigid body about an axis that includes endpoints of said line by manipulating said stylus.

45. The method of claim 37 further comprising translating a line as a rigid body from one position to a second position in the virtual work area by:
selecting said line using said stylus,
selecting said second position by locating said stylus at a corresponding position and orientation in the designer's work area, and
signaling the computer system by actuating said button.

46. The method of claim 45 further comprising translating said line by:
moving the line using the stylus in only a two dimensional plane of the display, notwithstanding any three dimensional movement of the stylus, and
rotating said model so that a desired plane of line movement is brought into coincidence with said plane of the display.

47. The method of claim 37 further comprising moving a first line connected to a second line by:
selecting the first line using said stylus,
causing said computer to move said first line about a joint with said second line by an amount and in a direction that corresponds to movement of said stylus.

48. The method of claim 37 further comprising moving a first line connected to a second line by:
selecting the first line using said stylus,
causing said computer to move said first line and said second line together by an amount and in a direction that corresponds to movement of said stylus.

49. The method of claim 37 further comprising modifying a line by causing points on a line to be displaced to change the shape of the line.

50. The method of claim 49 further comprising causing the direction of said displacement in the virtual work area to correspond to the direction in which the designer points said stylus in the designer's work area.

51. The method of claim 37 further comprising modifying a line by simulating grabbing a point on the line with said stylus and moving said point to change the shape of the line in response to corresponding movement of said stylus.

52. The method of claim 37 further comprising modeling a line with simulated physical characteristics so that the shape of said line responds to change according to said characteristics.

53. The method of claim 52 further comprising modifying said modeled line by applying a simulated force to points on the line to move the line in accordance with said force.

54. The method of claim 53 wherein the direction of said force in the virtual work area corresponds to the direction in which the designer points said stylus in the designer's work area.

55. The method of claim 33 further comprising drawing a line by
using said second sensor to draw said line,
generating a projection of said line on a planar working surface attached to said first sensor, and
then using said second sensor to draw the third dimension of said line outside of a plane represented by said planar working surface.

56. The method of claim 33 wherein said device for defining said work area comprises an emitter for transmitting a reference signal in said three-dimensional designer's work area, and further comprising, causing each one of said sensors to intercept said reference signal and provide said signals that indicate the position and orientation thereof based on said reference signal.

* * * * *

UNITED STATES PATENT AND TRADEMARK OFFICE
CERTIFICATE OF CORRECTION

PATENT NO. : 5,237,647
DATED : August 17, 1993
INVENTOR(S) : Andrew F. Roberts, Emanuel M. Sachs, David R. Stoops, Karl T. Ulrich, Todd L. Siler, David C. Gossard, George W. Celniker It is certified that error appears in the above-indentified patent and that said Letters Patent is hereby corrected as shown below:

Col. 2, line 39, insert --.-- after "designer".

Col. 6, line 62, insert --18-- after "source".

Col. 7, line 6, insert --12-- after "computer".

Col. 7, line 28, "Oriented" should be --oriented--.

Col. 7, line 41, start new paragrah after "button.".

Col. 7, line 62, insert --15-- after "area".

Col. 10, line 51, insert --:-- after "angles".

Col. 12, line 28, "oolers" should be --colors--.

Col. 12, line 60, insert --.-- after "tion".

Col. 13, line 40, insert --.-- after "function".

Col. 13, line 67, insert --.-- after "segments".

Col. 14, line 10, "palettes" should be --Palettes--.

Col. 14, line 16, insert --.-- after "palette".

Col. 16, line 52, insert --.-- after "drawing".

UNITED STATES PATENT AND TRADEMARK OFFICE
CERTIFICATE OF CORRECTION

PATENT NO.   : 5,237,647

DATED        : August 17, 1993

INVENTOR(S)  : Andrew F. Roberts, Emanuel M. Sachs, David R. Stoops, Karl T. Ulrich, Todd L. Siler, David C. Gossard, George W. Celniker It is certified that error appears in the above-identified patent and that said Letters Patent is hereby corrected as shown below:

Col. 22, line 29, insert --.-- after "process".

Col. 24, line 4, insert --[-- before "Rot.-".

Col. 28, line 65, "22" should be --522--.

Col. 30, after line 28, insert --The minimum energy will occur when e=0 and $\frac{dI(U+eE)}{de}=0$ .--

Col. 30, line 41, "$U[r_i,r_j]$" should be --$\hat{U}[r_i,r_j]$--.

Col. 30, line 43, "$U[r_i,r_j]$" should be --$\hat{U}[r_i,r_j]$--.

Col. 31, line 12, "$(U_r^2)$" should be --$(\hat{U}_r^2)$--.

UNITED STATES PATENT AND TRADEMARK OFFICE
CERTIFICATE OF CORRECTION

PATENT NO. : 5,237,647

DATED : August 17, 1993

INVENTOR(S) : Andrew F. Roberts, Emanuel M. Sachs, David R. Stoops, Karl T. Ulrich, Todd L. Siler, David C. Gossard, George W. Celniker It is certified that error appears in the above-identified patent and that said Letters Patent is hereby corrected as shown below:

Col. 31, line 16, "$(U_r^2)$" should be --$(\hat{U}_r^2)$--.

Col. 36, line 30, delete "said" after "when".

Col. 37, line 45, insert after "1" --wherein said second sensor is disposed in stylus that includes a button for allowing the designer to signal said computer system and said computer system displays a representation of said stylus at a location on the virtual work area that corresponds to the hand held location of the stylus in the designer's work area, and--.

Signed and Sealed this

Tenth Day of May, 1994

BRUCE LEHMAN

Commissioner of Patents and Trademarks